United States Patent
Koshi et al.

(10) Patent No.: US 12,172,341 B2
(45) Date of Patent: Dec. 24, 2024

(54) METHOD OF PRODUCING THERMOPLASTIC RESIN-IMPREGNATED SHEET-SHAPED REINFORCING FIBER BUNDLE

(71) Applicant: Toray Industries, Inc., Tokyo (JP)

(72) Inventors: Masayuki Koshi, Nagoya (JP); Shoma Ishida, Nagoya (JP); Yoshihiro Naruse, Nagoya (JP)

(73) Assignee: Toray Industries, Inc., Tokyo (JP)

(*) Notice: Subject to any disclaimer, the term of this patent is extended or adjusted under 35 U.S.C. 154(b) by 555 days.

(21) Appl. No.: 17/267,975

(22) PCT Filed: Aug. 20, 2019

(86) PCT No.: PCT/JP2019/032396
§ 371 (c)(1),
(2) Date: Feb. 11, 2021

(87) PCT Pub. No.: WO2020/040122
PCT Pub. Date: Feb. 27, 2020

(65) Prior Publication Data
US 2021/0213690 A1    Jul. 15, 2021

(30) Foreign Application Priority Data
Aug. 22, 2018   (JP) ................................ 2018-155450

(51) Int. Cl.
*B29B 15/12* (2006.01)
*B29B 15/14* (2006.01)
(Continued)

(52) U.S. Cl.
CPC ............ *B29B 15/125* (2013.01); *B29B 15/12* (2013.01); *B29B 15/122* (2013.01); *B29B 15/14* (2013.01);
(Continued)

(58) Field of Classification Search
CPC .......................... B29B 15/122; B29C 70/523
See application file for complete search history.

(56) References Cited

U.S. PATENT DOCUMENTS

| 4,899,688 A * | 2/1990 | Heckrotte ............... C03C 25/18 |
| | | 65/529 |
| 9,238,336 B2 * | 1/2016 | Ishibashi ............... B29B 15/125 |
| (Continued) | | |

FOREIGN PATENT DOCUMENTS

| JP | H6-31821 | 2/1994 |
| JP | 7-252372 | 10/1995 |
| (Continued) | | |

*Primary Examiner* — Benjamin A Schiffman
(74) *Attorney, Agent, or Firm* — DLA Piper LLP (US)

(57) ABSTRACT

A method produces thermoplastic resin-impregnated sheet-shaped reinforcing fiber bundle obtained by impregnating reinforcing fibers made from continuous fibers with a thermoplastic resin, said method including: an application step in which a sheet-shaped reinforcing fiber bundle obtained by arranging reinforcing fibers made from continuous fibers in one direction is passed through an application section which retains thermoplastic resin, and the thermoplastic resin is applied to the sheet-shaped reinforcing fiber bundle to constitute a thermoplastic resin-impregnated sheet-shaped reinforcing fiber bundle; a further impregnation step in which the applied thermoplastic resin is further impregnated into the inside of the thermoplastic resin-impregnated sheet-shaped reinforcing fiber bundle; and a shaping step in which the thermoplastic resin-impregnated sheet-shaped reinforcing fiber bundle is shaped and solidified by cooling.

15 Claims, 13 Drawing Sheets

(51) Int. Cl.
*B29C 70/20* (2006.01)
*B29C 70/50* (2006.01)
*B29C 70/68* (2006.01)
*C08J 5/24* (2006.01)
*B29K 101/12* (2006.01)
*B29K 105/08* (2006.01)
*C08J 5/04* (2006.01)

(52) U.S. Cl.
CPC ............ *B29C 70/20* (2013.01); *B29C 70/506* (2013.01); *B29C 70/68* (2013.01); *C08J 5/24* (2013.01); *B29K 2101/12* (2013.01); *B29K 2105/0872* (2013.01); *C08J 5/04* (2013.01)

(56) References Cited

U.S. PATENT DOCUMENTS

| | | | | |
|---|---|---|---|---|
| 10,814,524 | B2* | 10/2020 | Prins | B29B 15/122 |
| 2001/0001408 | A1* | 5/2001 | Belvin | B29B 15/122 |
| | | | | 156/181 |
| 2014/0175694 | A1* | 6/2014 | Mizuta | B29B 11/16 |
| | | | | 264/136 |
| 2018/0043580 | A1 | 2/2018 | Prins et al. | |
| 2021/0301096 | A1* | 9/2021 | Ochi | B32B 38/08 |

FOREIGN PATENT DOCUMENTS

| | | | |
|---|---|---|---|
| JP | 10337516 | A * | 12/1998 |
| JP | 3252278 | B | 2/2002 |
| JP | 2006-289714 | | 10/2006 |
| JP | 2012-016857 | | 1/2012 |
| JP | 2017-154330 | | 9/2017 |
| JP | 2017-533994 | | 11/2017 |
| JP | 2018-507801 | | 3/2018 |
| WO | 2001/028951 | | 4/2001 |
| WO | 2012/002417 | | 1/2012 |
| WO | 2013/038521 | | 3/2013 |
| WO | 2016/071266 | | 5/2016 |

* cited by examiner

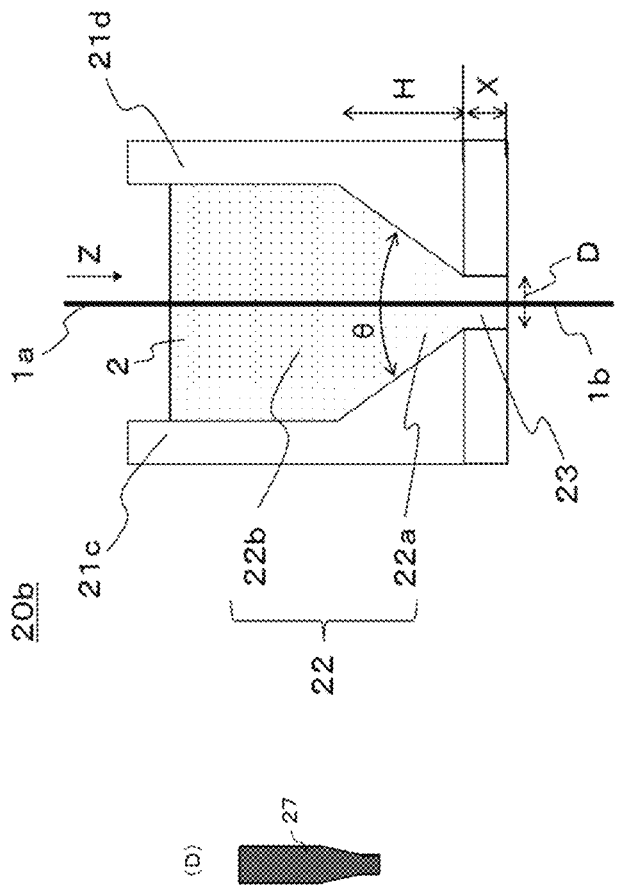
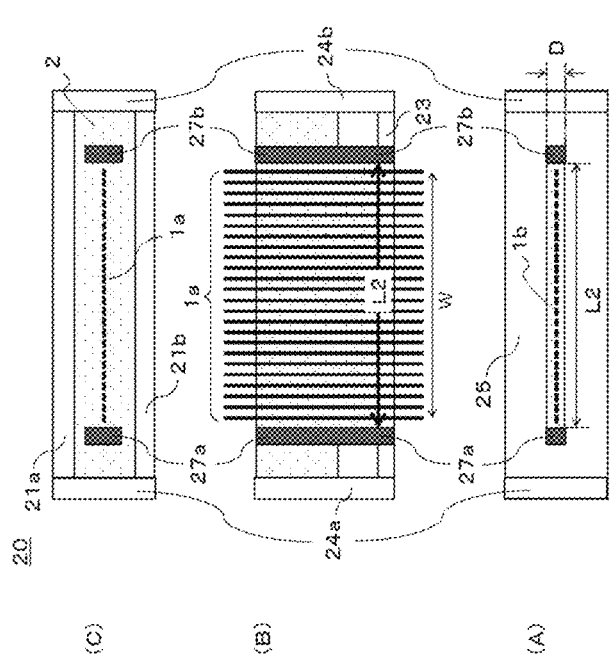

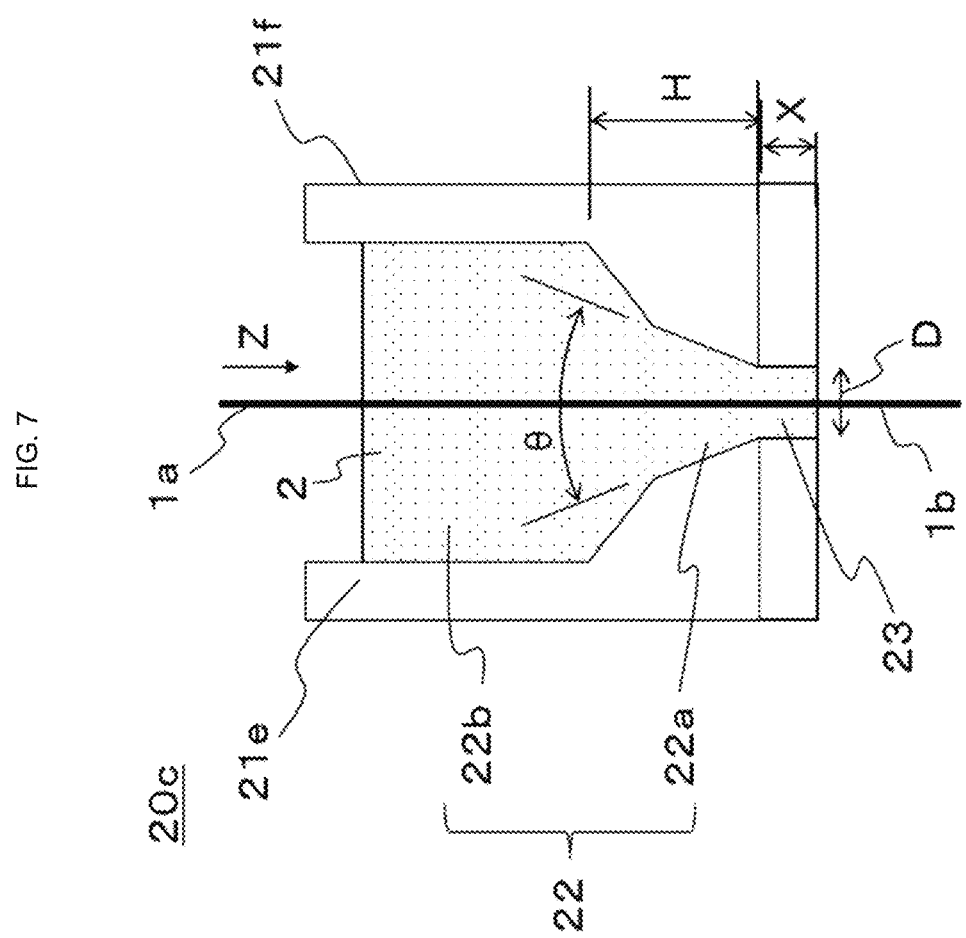

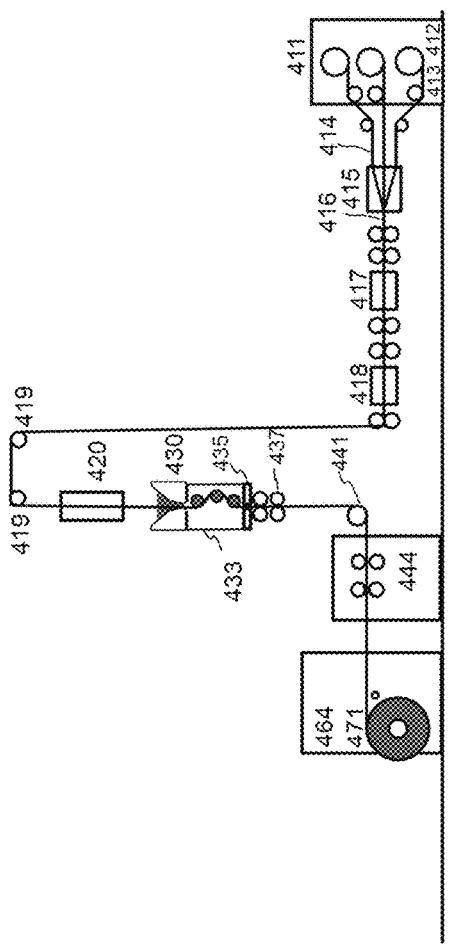
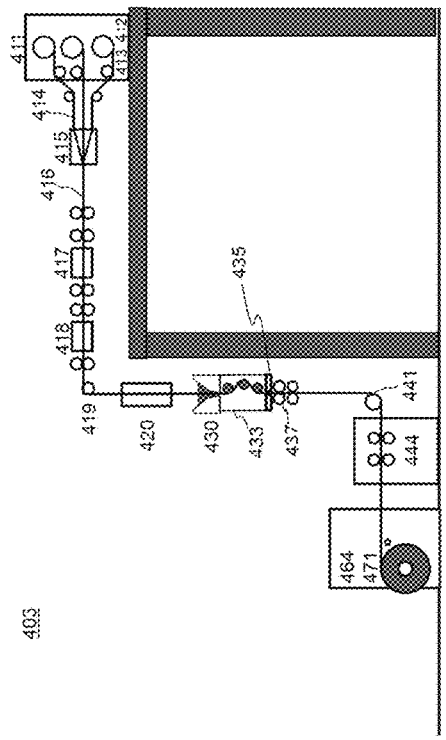

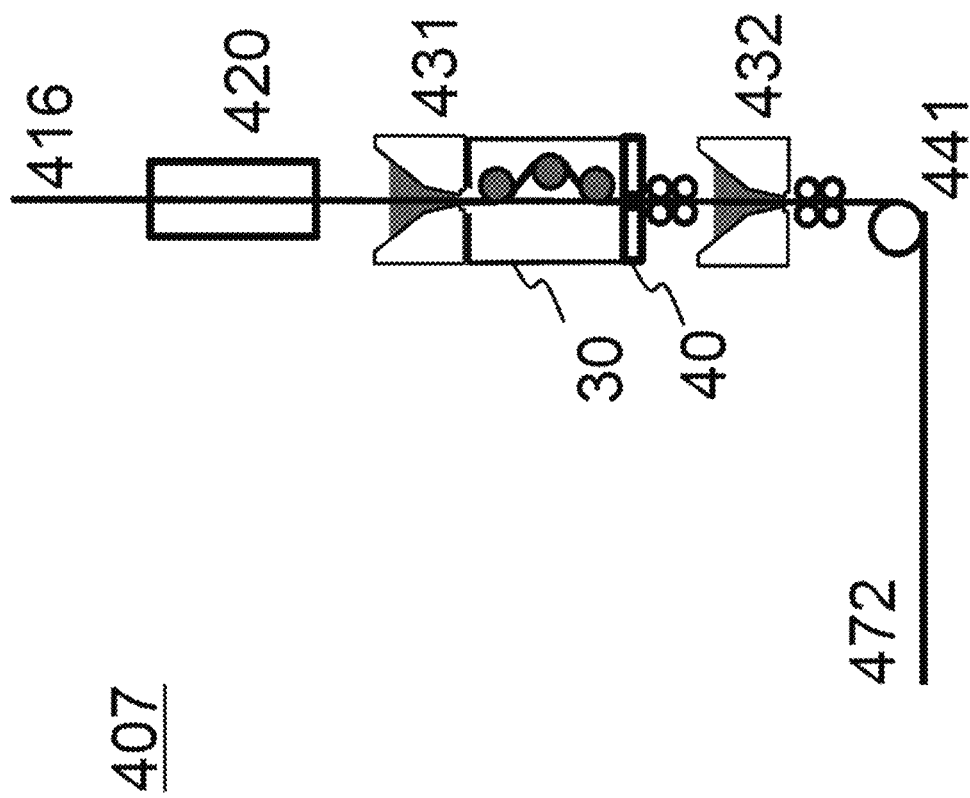

METHOD OF PRODUCING THERMOPLASTIC RESIN-IMPREGNATED SHEET-SHAPED REINFORCING FIBER BUNDLE

TECHNICAL FIELD

This disclosure relates to a method of producing a thermoplastic resin-impregnated sheet-shaped reinforcing fiber bundle, and specifically a method of impregnating a sheet-shaped reinforcing fiber bundle with a thermoplastic resin supplied uniformly.

BACKGROUND

Fiber-reinforced thermoplastic resin base materials made of continuous reinforcing fiber impregnated with thermoplastic resin are excellent in specific strength, specific rigidity, lightweight effect, heat resistance and chemical resistance so that they are suitably used for transportation equipment such as airplanes and automobiles or various products such as sporting gear and electric/electronic components. Because of recent increasing in demand of lightweight for airplanes and automobiles, metal parts have been replaced by resin parts while components have been downsized and modularized so that developments of material excellent in formability and mechanical characteristics have been demanded.

WO 2001/028951 discloses a fiber-reinforced thermoplastic resin prepreg consisting of polyamide resin containing carbon fibers as an example of constructional composite material excellent in formability and mechanical characteristics. Although such a prepreg is expected to be used as a lightweight material having high mechanical characteristics, excellent impregnation of fiber bundle with matrix resin is necessary to exhibit stable mechanical characteristics.

JP-H6-31821-A and WO 2012/002417 disclose a lateral takeout method to produce a prepreg comprising thermoplastic resin, characterized in that a band-shaped reinforcing fiber bundle is conveyed horizontally (laterally) to go through a die to be impregnated with thermoplastic resin attached. In JP-H6-31821-A, a tape-shaped reinforcing fiber bundle is fed through a crosshead in FIG. 2 to attach resin to the tape-shaped reinforcing fiber bundle just before a die in the crosshead. In WO 2012/002417, a plurality of band-shaped reinforcing fiber bundles are introduced separately into a die filled with melted thermoplastic resin and is opened, impregnated and laminated by a fixed guide (e.g. squeeze bar) and finally a sheet of prepreg is taken out from the die.

In JP-H6-31821-A, since the tape-shaped reinforcing fiber without resin goes through a slit-shaped guider tip at the front part of the die section in the crosshead so that fluff tends to clog the slit and cannot be removed, it is difficult for the fiber to continuously travel for a long time. It is particularly difficult for carbon fiber, which tends to fluff, to continuously travel for a long time.

When the production method is continuously performed in WO 2012/002417, fluff tends to stay at the liquid retainer section and tends to clog the takeout section. Particularly, because the band-shaped reinforcing fiber bundle traveling continuously at a high speed might increase the frequency of fluff clogging, production has to be performed slowly so that productivity cannot improve. In the lateral takeout method, when thermoplastic resin impregnates the inside of belt-shaped reinforcing fiber bundle, air bubbles left inside the belt-shaped reinforcing fiber bundle are discharged in the reinforcing fiber bundle orientation direction (thickness direction of band-shaped reinforcing fiber bundle) by buoyancy as pushing the impregnating thermoplastic resin out. Therefore, air bubble movement is prevented by the liquid while impregnation of thermoplastic resin is prevented by the air bubble so that the impregnation efficiency is poor. Although WO 2012/002417 suggests that air bubbles should be discharged from the vent, it seems that only the neighborhood of die outlet is improved.

Thus, known methods do not make it possible that unidirectionally-oriented reinforcing fiber bundles are efficiently impregnated with thermoplastic resin attached to and is used to efficiently produce a thermoplastic resin-impregnated sheet-shaped reinforcing fiber.

Accordingly, it could be helpful to provide a method of producing a thermoplastic resin-impregnated sheet-shaped reinforcing fiber bundle that can be performed continuously as suppressing fluff generation and fluff clogging, by efficiently impregnating a sheet-shaped reinforcing fiber bundle with thermoplastic resin to improve production rate.

SUMMARY

We thus provide:

[1] A method of producing a thermoplastic resin-impregnated sheet-shaped reinforcing fiber bundle, characterized in that reinforcing fibers made of a continuous fiber are impregnated with a thermoplastic resin, comprising: an application step of applying the thermoplastic resin to a sheet-shaped reinforcing fiber bundle consisting of unidirectionally disposed reinforcing fibers made of the continuous fiber and passing through an application section retaining the thermoplastic resin to make a fiber-reinforced thermoplastic resin; a further impregnating step of further impregnating the applied thermoplastic resin into the fiber-reinforced thermoplastic resin; and a shaping step of shaping the fiber-reinforced thermoplastic resin to be solidified by cooling, wherein the thermoplastic resin is applied to the fiber-reinforced thermoplastic resin passing vertically downward through the application section in the application step, and the thermoplastic resin is heated to a temperature of a melting point+30° C. or more to have a viscosity of 5 to 200 Pa·s in the application step and the further impregnation step.

[2] The method of producing a thermoplastic resin-impregnated sheet-shaped reinforcing fiber bundle according to [1], wherein the application section comprises a liquid retainer section and a narrowed section which are communicated with each other, the liquid retainer section has a part of which section area continuously decreases along a travelling direction of the sheet-shaped reinforcing fiber bundle, the narrowed section has a slit-shaped cross section of which area is smaller than that of a top face of the liquid retainer section, and the thermoplastic resin is retained for 1 to 60 min in the liquid retainer section.

[3] The method of producing a thermoplastic resin-impregnated sheet-shaped reinforcing fiber bundle according to [1] or [2], wherein shear force F defined by Formula (1) of 1 to 1,500 N acts on the sheet-shaped reinforcing fiber bundle in a slit-shaped section of the narrowed section in the application step.

$$F = 2 \times (Y+D) \times X \times \eta \times (U/\delta) \qquad (1)$$

F: shear force to act on narrowed section [N]
Y: width of narrowed section

D: gap of narrowed section
η: resin viscosity [MPa]
U: takeout speed [m/min]
δ: interfiber distance [mm]
X: length of narrowed section [mm]

[4] The method of producing a thermoplastic resin-impregnated sheet-shaped reinforcing fiber bundle according to any one of [1] to [3], wherein the application step, the further impregnation step and the shaping step are performed successively.

[5] The method of producing a thermoplastic resin-impregnated sheet-shaped reinforcing fiber bundle according to any one of [1] to [4], wherein the thermoplastic resin is applied in an inert gas atmosphere in the application step.

[6] The method of producing a thermoplastic resin-impregnated sheet-shaped reinforcing fiber bundle according to any one of [1] to [5], wherein the applied thermoplastic resin is further impregnated in an inert gas atmosphere in the further impregnation step.

[7] The method of producing a thermoplastic resin-impregnated sheet-shaped reinforcing fiber bundle according to any one of [1] to [6], wherein a ratio of fiber volume content of the fiber-reinforced thermoplastic resin after the application step relative to a fiber volume content of the thermoplastic resin-impregnated sheet-shaped reinforcing fiber bundle after the shaping step is 0.9 or more.

[8] The method of producing a thermoplastic resin-impregnated sheet-shaped reinforcing fiber bundle according to any one of [1] to [7], wherein width L [mm] of liquid retainer section at a bottom in a reinforcing fiber disposition direction and width W [mm] of the sheet-shaped reinforcing fiber bundle below the narrowed section satisfy L≤W+10 [mm].

[9] The method of producing a thermoplastic resin-impregnated sheet-shaped reinforcing fiber bundle according to any one of [1] to [8], wherein a width restriction mechanism to restrict a width of the sheet-shaped reinforcing fiber bundle is provided in the liquid retainer section, and width W [mm] of the sheet-shaped reinforcing fiber bundle below the narrowed section and width L2 [mm] restricted by the width restriction mechanism at a bottom end of the width restriction mechanism satisfy L2≤W+10 [mm], preferably L2≤W+2 [mm].

[10] The method of producing a thermoplastic resin-impregnated sheet-shaped reinforcing fiber bundle according to any one of [1] to [9], wherein the width restriction mechanism is provided over a whole length of the liquid retainer section and the narrowed section.

[11] The method of producing a thermoplastic resin-impregnated sheet-shaped reinforcing fiber bundle according to any one of [1] to [10], wherein the liquid retainer section has a part of which vertical height is 10 mm or more and of which section area continuously decreases.

[12] The method of producing a thermoplastic resin-impregnated sheet-shaped reinforcing fiber bundle according to any one of [1] to [11], wherein the sheet-shaped reinforcing fiber bundle is heated before passing through the application section in the application step.

[13] The method of producing a thermoplastic resin-impregnated sheet-shaped reinforcing fiber bundle according to any one of [1] to [12], wherein the sheet-shaped reinforcing fiber bundle is smoothed before passing through the application section in the application step.

[14] The method of producing a thermoplastic resin-impregnated sheet-shaped reinforcing fiber bundle according to any one of [1] to [13], wherein the sheet-shaped reinforcing fiber bundle is widened before passing through the application section in the application step.

[15] The method of producing a thermoplastic resin-impregnated sheet-shaped reinforcing fiber bundle according to any one of [1] to [14], wherein an ultrasonic vibration is transmitted to the fiber-reinforced thermoplastic resin in the further impregnation step.

[16] The method of producing a thermoplastic resin-impregnated sheet-shaped reinforcing fiber bundle according to any one of [1] to [15], wherein an ultrasonic vibration is transmitted to the thermoplastic resin retained in the application section.

[17] A thermoplastic resin-impregnated sheet-shaped reinforcing fiber bundle produced by the method according to any one of [1] to [16].

[18] A reinforcing fiber composite material produced by shaping the thermoplastic resin-impregnated sheet-shaped reinforcing fiber bundle according to [17].

Our method of producing a thermoplastic resin-impregnated sheet-shaped reinforcing fiber bundle makes it possible to supply thermoplastic resin constantly and uniformly at low cost. Further, continuous reinforcing fiber bundle can travel continuously and rapidly to improve the productivity of the thermoplastic resin-impregnated sheet-shaped reinforcing fiber bundle.

Furthermore, it is possible to provide a thermoplastic resin-impregnated sheet-shaped reinforcing fiber bundle excellent in impregnation and having less resin deterioration.

BRIEF DESCRIPTION OF THE DRAWINGS

FIG. 4b is a section view showing a flow of thermoplastic resin 2 at gap 26 in FIG. 4a.

FIG. 5 shows an example of installation of width restriction mechanism where (A) is viewed along direction A, (B) is viewed along direction B, (C) is viewed along direction Z and (D) is viewed in the same direction as FIG. 2.

FIG. 6 is a detailed cross section view showing application section 20b as another example of the one in FIG. 2.

FIG. 7 is a detailed cross section view showing application section 20c as another example of the one in FIG. 6.

FIG. 17 is a schematic section view showing another example of our production method/apparatus of prepreg.

FIG. 18 is a schematic section view showing another example of our production method/apparatus of prepreg.

FIG. 20 is a schematic section view showing another example of our production method/apparatus of prepreg having a plurality of application sections.

EXPLANATION OF SYMBOLS

Figure 1:
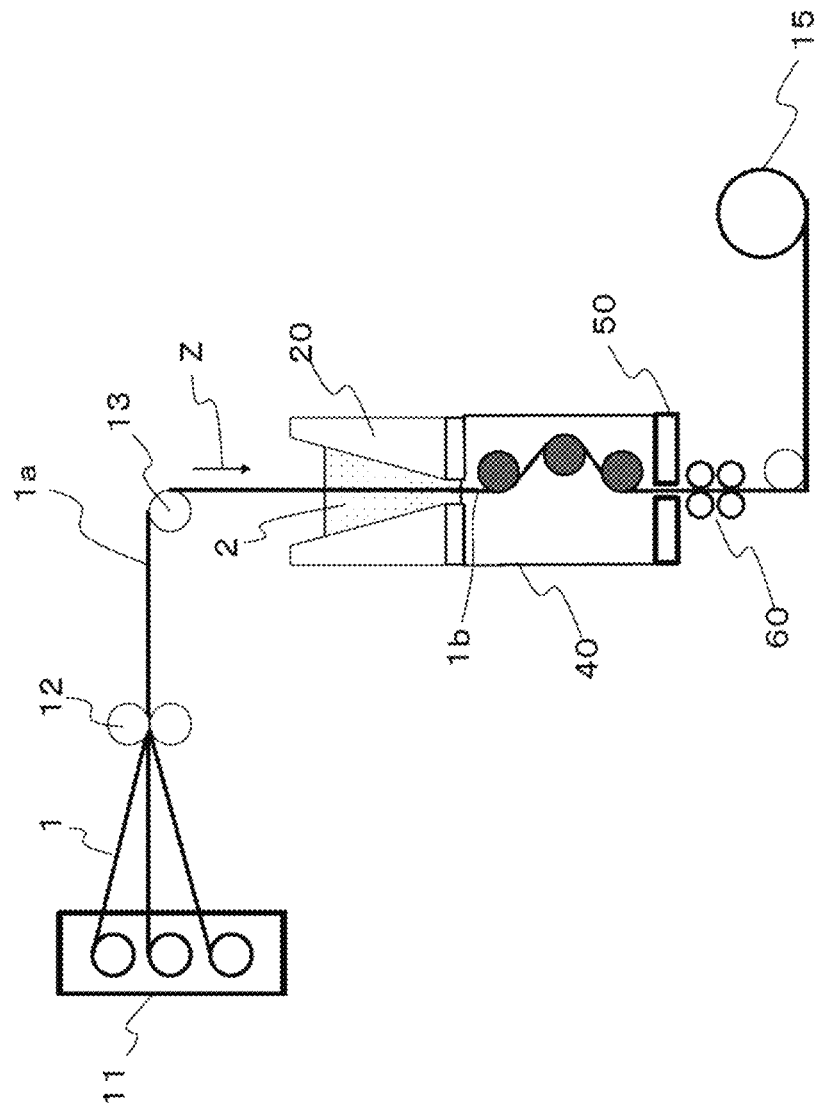
FIG. 1 is a schematic section view showing an example of our production method of thermoplastic resin-impregnated sheet-shaped reinforcing fiber bundle and a coating machine.

1: reinforcing fiber
1a: sheet-shaped reinforcing fiber bundle
1b: thermoplastic resin-impregnated sheet-shaped reinforcing fiber bundle
2: thermoplastic resin
11: creel
12: disposition device
13,14: conveyance roll
15: winding device
20: application section
20b: application section of another example
20c: application section of another example
20d: application section of another example
20e: application section of another example
21a,21b: wall surface member
21c,21d: wall surface member having different shape
21e,21f: wall surface member having different shape
21g,21h: wall surface member having different shape
21i,21j: wall surface member having different shape
22: liquid retainer section
22a: region of which section area continuously decreases in liquid retainer section
22b: region of which section area doesn't decrease in liquid retainer section
22c: region of which section area intermittently decreases in liquid retainer section
23: narrowed section
24a,24b: side plate member
25: outlet
26: gap
27a,27b: width restriction mechanism
30: application section of Comparative example 1
31a,31b: wall surface member of Comparative example 1
32: liquid retainer section of Comparative example 1
33: region of which section area continuously decreases in liquid retainer section of Comparative example 1
40: further impregnation section
41: impregnation bar
42: impregnation roll
43: impregnation belt
44a,44b,44c: belt-driven roll
45a,45b: press
50: shaping section
60: cooling/solidification section
100: coating machine
B: depth of liquid retainer section 22
C: upper liquid level of liquid retainer section 22
D: gap of narrowed section
F: shear force acting on narrowed section
G: position for width restriction
H: vertical height at which section area continuously decreases in liquid retainer section 22
L: width of liquid retainer section 22
M: volume of liquid retainer section 22
N: feed rate of thermoplastic resin
Q: retention time
R,Ra,Rb: vortex flow
T: circulating flow
U: takeout speed
X: length of narrowed section
W: width of thermoplastic resin-impregnated sheet-shaped reinforcing fiber bundle 1b measured just below narrowed section 23
Y: width of narrowed section 23
Z: travelling direction (vertically downward) of sheet-shaped reinforcing fiber bundle 1a
η: resin viscosity
δ: interfiber distance
θ: opened angle of tapered section
411: creel
412: reinforcing fiber bobbin
413: turning guide
414: reinforcing fiber bundle
415: reinforcing fiber disposition device
416: sheet-shaped reinforcing fiber bundle
417: widening device
418: smoothing device
419: turning roll
420: reinforcing fiber preheating device
430: application section
431: first application section
432: second application section
433: first further impregnation section
434: second further impregnation section
435: first shaping section
436: second shaping section
437: first cooling/solidification section
438: second cooling/solidification section
441: turning roll
444: takeout device
445: turning roll
447: laminating roll
464: winding device
471: prepreg (thermoplastic resin-impregnated sheet-shaped reinforcing fiber bundle)

DETAILED DESCRIPTION

Hereinafter, desirable examples will be explained with reference to figures. The following descriptions only explain examples of our methods and, therefore, the scope of this disclosure should be interpreted not only by specific descriptions but also by various possible modifications, within the purposes and effects.

With reference to FIG. 1, the outline of our producing method of thermoplastic resin-impregnated sheet-shaped reinforcing fiber bundle will be described. FIG. 1 is a schematic section view showing an example of our production method of thermoplastic resin-impregnated sheet-shaped reinforcing fiber bundle. Sheet-shaped reinforcing fiber bundle 1*a* passes through application section 20 retaining thermoplastic resin heated above the melting point+30° C. to quantitatively apply the thermoplastic resin thereto. Then, the thermoplastic resin-impregnated sheet-shaped reinforcing fiber bundle 1*b* having thermoplastic resin attached thereto is further impregnated with thermoplastic resin permeated to the inside of thermoplastic resin-impregnated sheet-shaped reinforcing fiber bundle 1*b* by further impregnation section 40. Then, after it passes through shaping section 50 and is formed into a predetermined shape, it is cooled and solidified below the melting point by cooling/solidification section 60. The coating machine is provided with application section 20, further impregnation section 40 and cooling/solidification section 60. Before or after the coating machine, it is possible to provide a plurality of creels 11 to roll reinforcing fiber 1 out, disposition device 12 to unidirectionally arrange the rolled-out reinforcing fibers 1 to prepare sheet-shaped reinforcing fiber bundle 1*a* (arranged along depth direction of paper in FIG. 1) or winding device 15 of thermoplastic resin-impregnated sheet-shaped reinforcing fiber bundle 1*b*. Further, the coating machine is provided with a feeding device of thermoplastic resin which is not shown in FIG. 1.

The "reinforcing fiber made of continuous fiber" means a reinforcing fiber without discontinuity in the thermoplastic resin-impregnated sheet-shaped reinforcing fiber bundle. The reinforcing fiber may have a form or layout such as unidirectionally-oriented fiber, woven fabric (cloth), knit, gimp and tow. Above all, it is preferable to employ the unidirectionally-oriented reinforcing fiber so that mechanical characteristics are efficiently enhanced in a predetermined direction.

The reinforcing fiber is not limited in particular and may be carbon fiber, metal fiber, organic fiber, inorganic fiber or the like. Two or more kinds thereof can be used together. The reinforcing fiber made of carbon fiber can make a lightweight thermoplastic resin-impregnated sheet-shaped reinforcing fiber bundle having high mechanical characteristics.

The carbon fibers include a PAN-based carbon fiber made from polyacrylonitrile (PAN) fiber, a pitch-based carbon fiber made from petroleum tar or petroleum pitch, a cellulose-based carbon fiber made from viscose rayon, cellulose acetate, a vapor-phase growth-type carbon fiber made from hydrocarbons, and a graphitized fiber thereof. Among these carbon fibers, it is preferable to employ the PAN-based carbon fiber from a viewpoint of balance between strength and elastic modulus.

The metal fiber may be a fiber made of metal such as iron, gold, silver, copper, aluminum, brass and stainless steel.

The organic fiber may be a fiber consisting of organic material such as aramid, polybenzoxazole (PBO), polyphenylene sulfide, polyester, polyamide and polyethylene. The aramid fiber may be a para-aramid excellent in strength and elastic modulus or may be a meta-aramid excellent in incombustibility and long-term heat resistance. The para-aramid fiber may be poly-p-phenylene terephthalamide fiber, copolyparaphenylene-3,4'-oxydiphenylene terephthalamide fiber or the like while the meta-aramid fiber may be poly-m-phenylene isophthalamide fiber. It is preferable that the aramid fiber is made of para-aramid fiber having an elastic modulus higher than that of meta-aramid fiber.

The inorganic fiber may be a fiber made of inorganic material such as glass, basalt, silicon carbide, silicon nitride or the like. The glass fiber may be E glass fiber (for electric use), C glass fiber (for corrosion resistance), S glass fiber, T glass fiber (high strength and high elastic modulus) or the like. The basalt fiber is highly heat resistant, made by fiberizing basalt mineral. The basalt generally contains iron compound of 9 to 25 wt % of FeO or $FeO_2$ as well as titanium compound of 1 to 6 wt % of TiO or $TiO_2$. The basalt fiber can be prepared by fiberizing these components increased in a melted state.

In our thermoplastic resin-impregnated sheet-shaped reinforcing fiber bundle, it is preferable that the reinforcing fiber comprises a carbon fiber, from a viewpoint of high mechanical characteristics required to the purpose of reinforcing member.

The sheet-shaped reinforcing fiber bundle typically consists of one or more reinforcing fiber bundles in which a number of single fibers are bundled. It is preferable that the reinforcing fiber bundle has a total filament number (the number of single fibers per bundle) of 1,000 to 2,000,000. From a viewpoint of productivity, it is preferable that the total filament number is 1,000 to 1,000,000. It is more preferably 1,000 to 600,000, particularly preferably 1,000 to 300,000. The upper limit of the total filament number should be decided so that the productivity, dispersibility and handling ability are maintained in a good balance.

It is preferable that the reinforcing fiber bundle consists of 1,000 to 50,000 of bundled reinforcing single fibers having an average diameter of 5 to 10 m.

The unidirectionally-oriented sheet-shaped reinforcing fiber bundle means a plurality of reinforcing fibers unidirectionally disposed on a plane surface. It is not necessary that the reinforcing fibers are integrated by connecting mutually or the like. Such arranged reinforcing fibers are called a sheet-shaped reinforcing fiber bundle for convenience because the sheet-shaped fiber is made by impregnating the fiber with thermoplastic resin applied to the fiber. The thermoplastic resin-impregnated sheet-shaped reinforcing fiber is called "unidirectional material" or "UD material" in the composite material industry. Thickness and width of the sheet-shaped reinforcing fiber bundle can be chosen unlimitedly according to the purpose and use. A tape of gathered single carbon fibers of 1,000 to 1,000,000 is generally called "tow". The tows can be disposed or laminated in the thickness direction to prepare a sheet-shaped reinforcing fiber bundle. From a viewpoint of good handling ability, it is preferable that the sheet-shaped reinforcing fiber bundle has 10 or more of aspect ratio which is defined as width/thickness. The sheet-shaped reinforcing fiber bundle includes even a tape of "tow".

The sheet-shaped reinforcing fiber bundle can be formed by a conventional method unlimitedly. From viewpoints of efficient process and uniform disposition, it is preferable that reinforcing fiber bundles consisting of preliminarily arranged single fibers are further arranged to form a sheet-shaped reinforcing fiber bundle. For example, the sheet-shaped reinforcing fiber bundle can be prepared by arranging tape-shaped reinforcing fiber bundle drawn from the above-described carbon fiber "tow" of tape-shaped reinforcing fiber bundle wound around a bobbin. It is preferable to provide a reinforcing fiber disposition mechanism to orderly dispose the reinforcing fiber bundles drawn from the bobbin set to the creel so that undesirable overlap and folding of reinforcing fiber bundles or undesirable gap between reinforcing fiber bundles is reduced in the sheet-shaped reinforcing fiber bundle. The reinforcing fiber disposition mechanism may be a conventional roller or a comb-shaped disposition device. From a viewpoint of reduction of gap between reinforcing fibers, it is preferable that a plurality of preliminarily disposed sheet-shaped reinforcing fiber bundles are stacked. It is preferable that the creel is provided with a tension control mechanism to control tension generated when the reinforcing fiber is drawn out. The tension control mechanism may be a conventional mechanism such as brake. It is also possible to control tension by adjusting the yarn passage guide.

Uniformity of application amount can be improved at the application section by a smoothing treatment to increase the surface smoothness of sheet-shaped reinforcing fiber bundle. Therefore, it is preferable that after the sheet-shaped reinforcing fiber bundle is subject to a smoothing treatment it is led to the liquid retainer section. The smoothing treatment may be performed by a method of physically pressing the reinforcing fiber by opposing rolls, or alternatively by another method of moving the reinforcing fiber by air flow. It is preferable to employ the method of physically pressing it from viewpoints of simplicity and less disturbed disposition of reinforcing fibers. It may be performed by a calendar processing. It is also preferable to employ the method of moving the reinforcing fiber by air flow so that the sheet-shaped reinforcing fiber bundle is widened with less abrasion.

From a viewpoint of efficient production of thin prepreg, it is preferable that after the sheet-shaped reinforcing fiber bundle is widened it is led to the retainer section. The widening step may be performed by a method of mechanically generating vibration, or alternatively by another method of widening the reinforcing fiber bundle by air flow. The method of mechanically generating vibration may be a method of bringing a sheet-shaped reinforcing fiber bundle into contact with a vibrating roll as shown in JP2015-22799-A. It is preferable that the sheet-shaped reinforcing fiber bundle traveling along X-axis direction is given a vibration along Y-axis direction (horizontal direction) or a vibration along Z-axis direction (vertical direction). It is also preferable that a horizontally-vibrating roll and a vertically-vibrating roll are employed together. From a viewpoint of abrasion prevention between reinforcing fibers and the roll, it is preferable that the vibration roll is provided with a plurality of protrusions on the surface. The air flow can be utilized by a method disclosed in SEN-IGAKKAISHI, vol. 64, P-262-267(2008).

From viewpoints of suppression of thermoplastic resin temperature drop and improvement of uniformity of thermoplastic resin viscosity it is preferable that after the sheet-shaped reinforcing fiber bundle is heated it is led to the liquid retainer section. It is preferable that the sheet-shaped reinforcing fiber bundle is heated up almost to the thermoplastic resin temperature by a heating such as air heating, infrared heating, far infrared heating, laser heating, contact heating and heat medium heating (e.g. steam). Above all, it is preferable to employ the simple infrared heating capable of directly heating the sheet-shaped reinforcing fiber bundle efficiently to a desirable temperature even at a high traveling speed.

The thermoplastic resin may be a polyester such as polyethylene terephthalate (PET) resin, polybutylene terephthalate (PBT) resin, poly trimethylene terephthalate (PTT) resin, polyethylene naphthalate (PEN) resin and liquid crystalline polyester resin, a polyolefin such as polyethylene (PE) resin, polypropylene (PP) resin and polybutylene resin, a styrene-based resin, or polyoxymethylene (POM) resin, polyamide (PA) resin, polycarbonate (PC) resin, polymethyl methacrylate (PMMA) resin, polyvinyl chloride (PVC) resin, polyphenylene sulfide (PPS) resin, polyphenylene ether (PPE) resin, modified PPE resin, polyimide (PI) resin, polyamide-imide (PAI) resin, polyetherimide (PEI) resin, polysulfone (PSU) resin, modified PSU resin, polyether sulfone resin, polyketone (PK) resin, polyarylene ether ketone (PAEK) resin, polyarylate (PAR) resin, polyether nitrile (PEN) resin, phenolic resin, phenoxyresin, a fluorine-based resin such as the polytetrafluoroethylene resin, a thermoplastic elastomer such as polystyrene-based resin, polyolefin-based resin, polyurethane-based resin, polyester-based resin, polyamide-based resin, polybutadiene-based resin and fluorine-based resin. It may also be a copolymer, a modification or a blend thereof. The polyarylene ether ketone resin (PAEK) includes polyether ketone (PEK), polyether ether ketone (PEEK), polyether ether ketone ketone (PEEKK), polyether ketone ketone (PEKK), polyether ketone ether ketone ketone (PEKEKK), polyether ether ketone ether ketone (PEEKEK), polyether ether ether ketone (PEEEK) and polyether diphenyl ether ketone (PEDEK), and a copolymer, a modification and a blend thereof. From viewpoints of heat resistance and chemical resistance in particular, it is preferable to employ PPS resin, PEEK resin or PEKK resin. From viewpoints of shaped product appearance and dimension stability, it is preferable to employ polycarbonate resin or styrene-based resin. From viewpoints of shaped product strength and impact resistance, it is preferable to employ polyamide resin. It is also preferable that these thermoplastic resins are blended as needed for required characteristics such as fluidity and formability.

Our thermoplastic resin-impregnated sheet-shaped reinforcing fiber bundle is made by applying the thermoplastic resin to the reinforcing fiber made of continuous fiber. It may further contain filler, another kind of polymer, additive or the like as needed.

The filler may be any filler used with resin to improve strength, rigidity, heat resistance or dimension stability of thermoplastic resin-impregnated sheet-shaped reinforcing fiber bundle or its shaped product. The filler includes a fibrous inorganic filler such as glass fiber, carbon fiber, potassium titanate whisker, zinc oxide whisker, aluminum borate whisker, aramid fiber, alumina fiber, silicon carbide fiber, ceramic fiber, asbestos fiber, gypsum fiber and metal fiber, as well as non-fibrous inorganic filler such as wollastonite, zeolite, sericite, kaolin, mica, talc, clay, pyrophyllite, bentonite, montmorillonite, asbestos, aluminosilicate, alumina, silicon oxide, magnesium oxide, zirconium oxide, titanium oxide, iron oxide, calcium carbonate, magnesium carbonate, dolomite, calcium sulfate, barium sulfate, magnesium hydroxide, calcium hydroxide, aluminium hydroxide, glass bead, ceramic bead, boron nitride, silicon carbide and silica. It is possible to contain two or more kinds thereof. The filler may be hollow. It may be the one treated with coupling agent made of compound such as isocyanate-based compound, organosilane-based compound, organotitanate-based compound, organoborane-based compound and epoxy compound. The montmorillonite may be an organic montmorillonite made by cation-exchanging the interlayer ion with organic ammonium salt. The fibrous filler consisting of discontinuous fibers can function without deteriorating the reinforcement effect of reinforcing fiber consisting of continuous fibers.

The other kind of polymer includes polyolefin such as polyethylene and polypropylene, an elastomer such as polyamide-based elastomer and polyester-based elastomer, or polyester, polycarbonate, polyphenylene ether, polyphenylene sulfide, liquid crystalline polymer, polysulfone, polyether sulfone, ABS resin, SAN resin, polystyrene or the like. It is possible to contain two or more kinds thereof. To improve impact resistance of thermoplastic resin-impregnated sheet-shaped reinforcing fiber bundle made from thermoplastic resin, it is preferable to employ an impact modifier made of modified polyolefin such as (co)polymer of olefin-based compound and/or conjugated diene-based compound, or polyamide-based elastomer or polyester-based elastomer.

The (co)polymer of olefin-based compound and/or conjugated diene-based compound may be ethylene-based copolymer, conjugated diene-based polymer, conjugated diene-aromatic vinyl hydrocarbon-based copolymer or the like.

The ethylene-based copolymer may be a ethylene copolymer with α-olefin having 3 or more of carbon number, unconjugated diene, vinyl acetate, vinyl alcohol, α,β-unsaturated carboxylic acid or its derivative, or the like. The α-olefin of 3 or more of carbon number includes propylene and butene-1. The unconjugated diene includes 5-methylidene-2-norbornene, 5-ethylidene-2-norbornene, dicyclopentadiene and 1,4-hexadiene. The α,β-unsaturated carboxylic acid includes acrylic acid, methacrylic acid, ethacrylic acid, crotonic acid, maleic acid, fumaric acid, itaconic acid, citraconic acid and butene dicarboxylic acid. The derivative of α,β-unsaturated carboxylic acid includes alkyl ester, aryl ester, glycidyl ester, acid anhydride and imide of α,β-unsaturated carboxylic acid.

The conjugated diene-based polymer means a polymer containing at least one kind of conjugated diene. The conjugated diene includes 1,3-butadiene, isoprene (2-methyl-1,3-butadiene), 2,3-dimethyl-1,3-butadiene and 1,3-pentadiene. It is possible that a part or all parts of the unsaturated bond of the polymer is reduced by hydrogenation.

The conjugated diene-aromatic vinyl hydrocarbon-based copolymer is defined as a copolymer of conjugated diene and aromatic vinyl hydrocarbon, including block copolymer and random copolymer. The conjugated diene includes 1,3-butadiene and isoprene. The aromatic vinyl hydrocarbon includes styrene. It is possible that a part or all parts of unsaturated bond other than the double bond except the aromatic ring of the conjugated diene-aromatic vinyl hydrocarbon-based copolymer is reduced by hydrogenation.

The impact modifier may be an ethylene/methacrylic acid copolymer or its salt in which a part or all of carboxylic acids of the copolymer has been substituted by sodium, lithium, potassium, zinc or calcium ion. It may also be ethylene/propylene-g-maleic anhydride copolymer, ethylene/butene-1-g-maleic anhydride copolymer or the like.

The additive may be an antioxidant or a thermostabilizer (hindered phenols, hydroquinones, phosphites or substitute thereof, copper halide, iodine compound or the like), a weathering agent (based on resorcinol, salicylate, benzotriazole, benzophenone, hindered amine system), a release agent or a lubricant (aliphatic alcohol, aliphatic amide, aliphatic bis-amide, bis-urea, polyethylene wax or the like), a colorant (cadmium sulfide, phthalocyanine, carbon black or the like), a dye (nigrosin, aniline black or the like), a plasticizer (octyl p-hydroxybenzoate, N-butyl benzene sulfonamide or the like), an antistatic agent (alkyl sulfate-type anion-based antistatic agent, quarternary ammonium salt-type cation-based antistatic agent, non-ionic antistatic agent such as polyoxyethylene sorbitan monostearate, betaine-based amphoteric antistatic agent), a fire-retardant (melamine cyanurate, hydroxide such as magnesium hydroxide and aluminium hydroxide, ammonium polyphosphate, brominated polystyrene, brominated polyphenylene oxide, brominated polycarbonate, brominated epoxy resin, or a combination of these bromine-based fire-retardant and antimony trioxide) or the like. It is possible to contain two or more kinds thereof.

It is important to select a preferable viscosity of our thermoplastic resin from viewpoints of processability and stability. Specifically, the viscosity should be 5 to 200 Pa·s in the application step and further impregnation step. The viscosity within the range can improve stability of travel performance at a high speed of the sheet-shaped reinforcing fiber bundle. The melt viscosity can be measured with a capillary flow meter at shear speed of 9728 sec$^{-1}$ after thermoplastic resin is retained for 5 minutes to be melted at temperature of thermoplastic resin melting point+30° C. As for the evaluation condition of melt viscosity in the specification, we selected the above-described temperature and shear speed because we regard the temperature as capable of preventing thermolysis during short retention time while we regard such a high shear speed as a similar condition of passing through the narrowed section at application section outlet. It is preferable that the viscosity of the thermoplastic resin is 20 to 100 Pa·s.

It is important to select a preferable temperature of the thermoplastic resin from a viewpoint of stability of the thermoplastic resin. Specifically, the thermoplastic resin temperature should be set between the melting point+30° C. and the melting point+100° C. The temperature within the range can improve stability of the thermoplastic resin. In a thermoplastic resin that is an amorphous resin having no melting point, it is possible to select such a temperature as not deteriorating the stability of the thermoplastic resin.

Our application step of thermoplastic resin will be explained with reference to the figures. To apply thermoplastic resin 2 to sheet-shaped reinforcing fiber bundle 1a by coating machine 2, a plurality of reinforcing fibers 1 rolled out from creel 11 are disposed unidirectionally (along paper depth) by disposition device 12 to prepare sheet-shaped reinforcing fiber bundle 1a to pass through application section 20 to apply thermoplastic resin 2 to both sides of sheet-shaped reinforcing fiber bundle 1a. Thermoplastic resin-impregnated sheet-shaped reinforcing fiber bundle 1b is thus obtained.

In the application step, the sheet-shaped reinforcing fiber bundle should travel vertically downward, from viewpoints of retaining easiness of thermoplastic resin at the application section and impregnation of sheet-shaped reinforcing fiber bundle with thermoplastic resin.

It is preferable that the thermoplastic resin is retained for 1 to 60 min at the liquid retainer section in the application step. The retention time of 1 min or more makes it possible to apply thermoplastic resin stably. It is more preferably 5 min or more, preferably 10 min or more. The retention time of 60 min or less makes it possible to apply thermoplastic resin without deterioration and bridging of thermoplastic resin. It is more preferably 40 min or less. It is further preferably 30 min or less, preferably 20 min or less.

Retention time Q [min] can be calculated by Formula (2) from volume M [cm$^3$] of liquid retainer section and feed rate N [cm$^3$/min] of thermoplastic resin.

$$Q \text{ [min]} = M \text{ [cm}^3\text{]}/N \text{ [cm}^3\text{/min]} \quad (2)$$

In the application step, it is possible that the application section to retain thermoplastic resin is charged with inert gas. The liquid retainer section charged with the inert gas can prevent thermoplastic resin from deteriorating and bridging. The kind of the inert gas is not limited in particular. From viewpoints of handling ability and productivity, it is preferably nitrogen gas. The temperature of the inert gas is not limited in particular. From a viewpoint of stability of resin temperature, it is preferable that the inert gas is heated to the same level of thermoplastic resin temperature.

Figure 2:
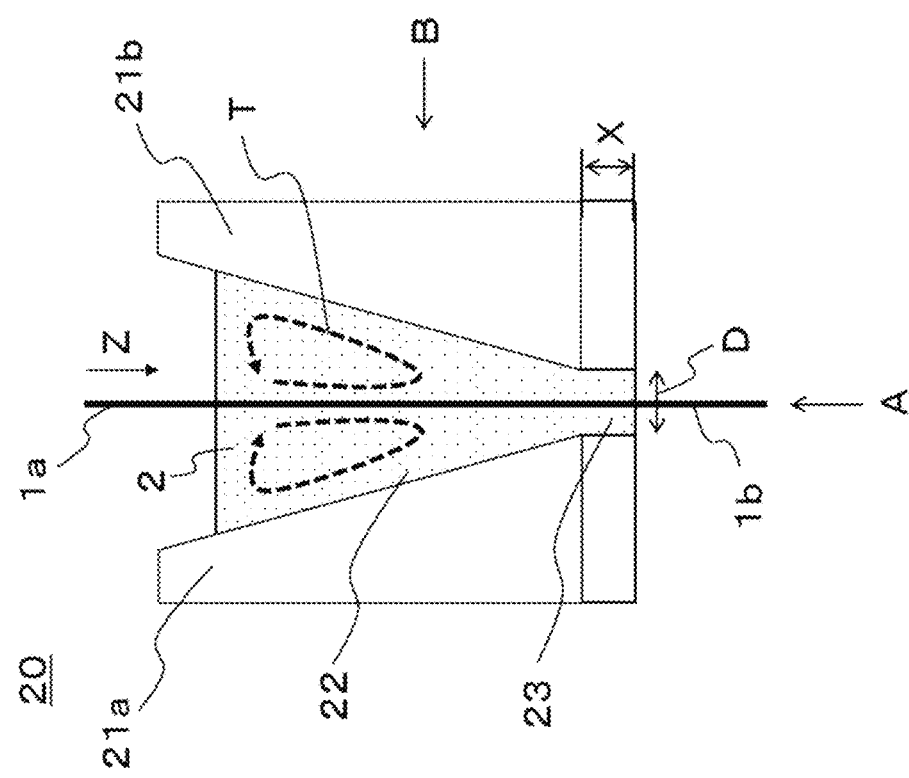
FIG. 2 is a detailed cross section view showing application section 20 enlarged in FIG. 1.
Figure 4A:
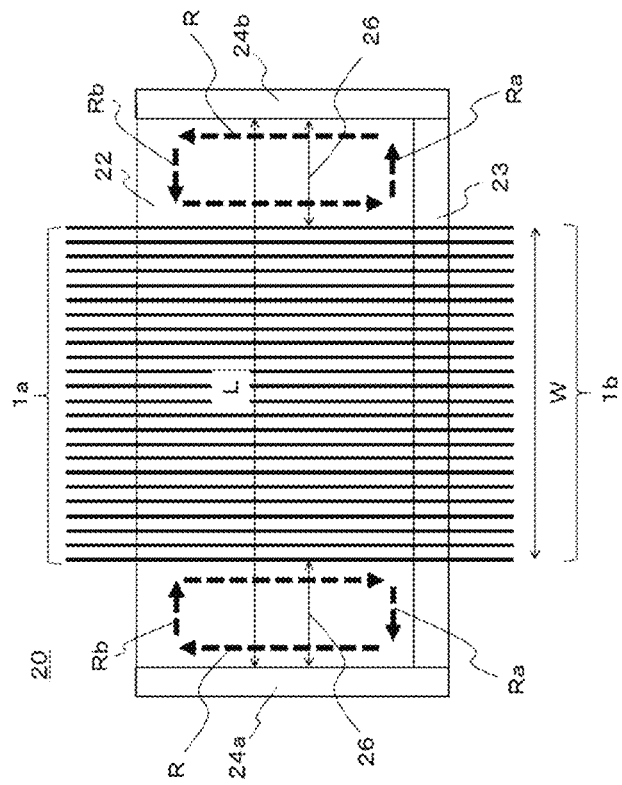
FIG. 4a is a section view showing internal structure of application section 20 viewed along direction B in FIG. 2.
Figure 4B:
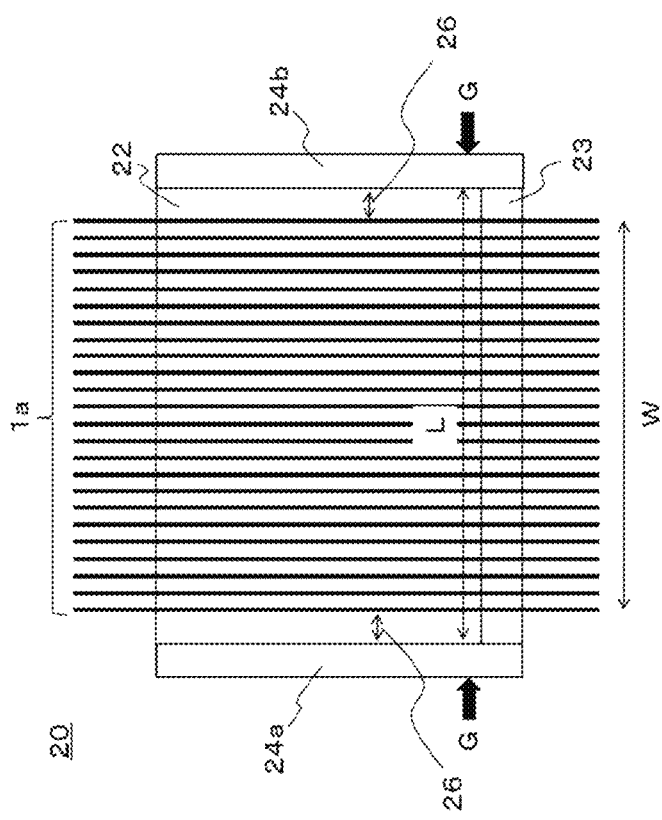

With reference to FIGS. 2, 4a and 4b, application step of thermoplastic resin 2 attached to sheet-shaped reinforcing fiber bundle 1a will be explained in detail. FIG. 2 is a detailed cross section view showing enlarged application section 20 in FIG. 1. Application section 20 comprises wall surfaces 21a,21b opposing each other through predetermined gap D. Between wall surfaces 21a and 21b, formed are liquid retainer section 22 of which section area continuously decreases vertically downward (sheet-shaped reinforcing fiber bundle traveling direction Z) and slit-shaped narrowed section 23 which is located at the bottom side (carry-out side of sheet-shaped reinforcing fiber bundle 1a) of liquid retainer section 22 and has a section area smaller than that of top face (carry-in side of sheet-shaped reinforcing fiber bundle 1a) of liquid retainer section 22. In FIG. 2, sheet-shaped reinforcing fiber bundles 1a are disposed in the paper depth direction.

In application section 20, sheet-shaped reinforcing fiber bundle 1a introduced in liquid retainer section 22 travels vertically downward as accompanying neighbor thermoplastic resin 2. Since liquid retainer section 22 has a section area decreasing vertically downward (traveling direction Z of sheet-shaped reinforcing fiber bundle 1a), accompanied thermoplastic resin 2 is gradually compressed to increase the pressure of thermo plastic resin 2 downward in liquid retainer section 22. The pressure at the bottom of liquid retainer section 22 increases to make the accompanied liquid difficult to flow downward so that it flows toward wall surface members 21a,21b, and then is blocked by wall surface members 21a,21b and flows upward. As a result, circulating flow T in liquid retainer section 22 is formed along the plane of sheet-shaped reinforcing fiber bundle 1a and wall surfaces of wall surface members 21a,21b. Therefore, fluff traveling along circulating flow T cannot approach the bottom of liquid retainer section 22 or narrowed section 23 by its great hydraulic pressure even if sheet-shaped reinforcing fiber 1a brings the fluff into liquid retainer section 22. Further, air bubbles attached to the fluff move the fluff upward from circulation flow T to pass through the neighborhood of upper liquid level in liquid retainer section 22. Therefore, the retained fluff is not only prevented from clogging the bottom of liquid retainer section 22 and narrowed section 23 but also collected easily from the upper liquid level in liquid retainer section 22. Furthermore, when sheet-shaped reinforcing fiber bundle 1a travels at high speed, the hydraulic pressure is further increased to enhance the effect of excluding fluff. As a result, thermoplastic resin 2 can be attached at high speed to sheet-shaped reinforcing fiber bundle 1a to greatly improve productivity.

The inside of sheet-shaped reinforcing fiber bundle 1a is easily impregnated with thermoplastic resin 2 by the increased hydraulic pressure. This is caused based on Darcy's law according to which the thermoplastic resin pressure increases impregnation degree when a porous body (having a gap between adjacent single fibers) like the sheet-shaped reinforcing fiber bundle is impregnated with thermoplastic resin. Accordingly, when sheet-shaped reinforcing fiber bundle 1a travels at high speed, the hydraulic pressure is increased to enhance the effect of impregnation. Sheet-shaped reinforcing fiber bundle 1a is impregnated with thermoplastic resin 2 by gas/liquid substitution to residual air bubbles inside while the air bubbles are discharged along fiber orientation direction (vertically upward) through gaps in the sheet-shaped reinforcing fiber bundle 1a by the hydraulic pressure and buoyancy. Since the air bubbles are discharged without pushing thermoplastic resin 2 out, impregnation is not obstructed. Since some air bubbles discharged outward along normal direction from the surface of sheet-shaped reinforcing fiber bundle 1a are excluded rapidly vertically upward by the hydraulic pressure and buoyancy, the air bubbles can be efficiently discharged without staying at the bottom of liquid retainer section 22 where impregnation can be well performed. By these effects, sheet-shaped reinforcing fiber bundle 1a can be impregnated with thermoplastic resin 2 efficiently to make it possible to provide thermoplastic resin-impregnated sheet-shaped reinforcing fiber bundle 1b of which quality is high with uniformly impregnated thermoplastic resin 2.

Further, fluff can be prevented from generating since sheet-shaped reinforcing fiber bundle 1a is automatically aligned by the above-described hydraulic pressure into the center of gap D without direct contact of sheet-shaped reinforcing fiber bundle 1a with liquid retainer section 22 or with wall surface of narrowed section 23. That is, when sheet-shaped reinforcing fiber bundle 1a disturbed comes close in either gap D at which thermoplastic resin 2 is pressed in the narrow gap to be compressed to increase the hydraulic pressure, sheet-shaped reinforcing fiber bundle 1a is pushed back to the center of gap D.

Narrowed section 23 has a section area smaller than that of top face of liquid retainer section 22. As shown in FIGS. 2, 4a and 4b, the section area becomes smaller when the length of pseudo-plane formed by the sheet-shaped reinforcing fiber bundle along the perpendicular line is shorter and namely the distance between members is narrower. The effect of impregnation or automatic alignment can be achieved by increasing hydraulic pressure at the narrowed section as described above. From viewpoints of traveling performance of sheet-shaped reinforcing fiber bundle 1a and flow control of thermoplastic resin 2, it is preferable that the section shape of uppermost face of narrowed section 23 is the same as the section shape of lowermost liquid retainer section 22. It is possible that the section area of narrowed section 23 is slightly larger as needed.

The traveling direction may be vertically downward in a practical way to the extent that sheet-shaped reinforcing fiber bundle 1a can continuously travel stably as achieving the fluff collection and air bubble discharge, although sheet-shaped reinforcing fiber bundle 1a travels vertically downward (90 from the horizontal plane) at application section 20 shown in FIG. 2. The said "vertically downward in a practical way" includes a direction within the range of 5° from the vertical direction.

The amount of thermoplastic resin 2 attached to sheet-shaped reinforcing fiber bundle 1a can be controlled by adjusting gap D of narrowed section 23. To increase the amount (to increase basis weight) of thermoplastic resin 2 applied to sheet-shaped reinforcing fiber bundle 1a, it is possible to provide wall surface members 21a,21b widening gap D.

Figure 3:
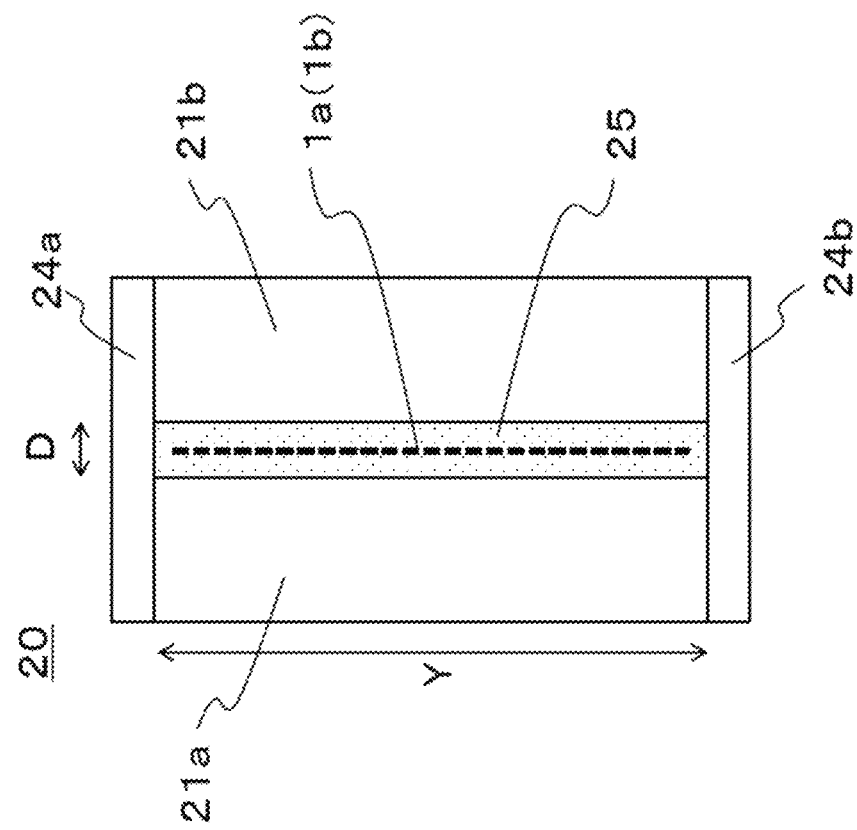
FIG. 3 is a bottom view showing application section 20 viewed along direction A in FIG. 2.

FIG. 3 is a bottom view of application section 20 viewed along direction A in FIG. 2. Application section 20 is provided with sidewall members 24a,24b to prevent thermoplastic resin 2 from leaking out from both ends in the disposition direction of sheet-shaped reinforcing fiber bundle 1a while outlet 25 of narrowed section 23 is formed in the space surrounded by wall surface members 21a,21b and sidewall members 24a,24b. The section aspect ratio (Y/D shown in FIG. 3) of slit-shaped outlet 25 can be designed according to the shape of sheet-shaped reinforcing fiber bundle 1a to attach thermoplastic resin 2 to.

It is preferable that a shear force defined by Formula (1) of 1 to 1,500 N acts on sheet-shaped reinforcing fiber bundle 1a at narrowed section 23. The shear force within the range can achieve both of suppressing fluff generation at the narrowed section and impregnation of the thermoplastic resin.

$$F = 2 \times (Y+D) \times X \times \eta \times (U/\delta) \quad (1)$$

F: shear force to act on narrowed section [N]
Y: width of narrowed section
D: gap of narrowed section
η: resin viscosity [MPa]
U: takeout speed [m/min]
δ: interfiber distance [mm]
X: length of narrowed section [mm]

FIG. 4a is a section view of internal structure of application section 20 viewed along direction B. Although wall surface member 21b is omitted and sheet-shaped reinforcing fiber bundles 1a are depicted as being disposed through spaces for simplicity, it is preferable that reinforcing fibers 1 are disposed without any space from viewpoints of quality of thermoplastic resin-impregnated sheet-shaped reinforcing fiber bundle and mechanical characteristics of FRP.

FIG. 4b shows a flow of thermoplastic resin 2 at gap 26. When gap 26 is wide, vortex flow is generated in direction R. Vortex flow R directed outward (Ra) at the bottom of liquid retainer section 22 might tear apart the sheet-shaped reinforcing fiber bundle (to generate crack of sheet-shaped fiber bundle) or might widen the distance between reinforcing fibers so that a thermoplastic resin-impregnated sheet-shaped reinforcing fiber bundle contains uneven disposition of reinforcing fibers. On the other hand, the flow directed inward (Rb) at the top of liquid retainer section 22 might compress sheet-shaped reinforcing fiber bundle 1a in the width direction to bend an edge. However, such concern has not been addressed because product quality is less affected by vortex flow generated in gap 26 of the device disclosed in JP 3252278-B to apply thermoplastic resin to integrated sheet-shaped base material (film, specifically) on both sides.

It is preferable that a width restriction is performed to reduce gap 26 so that vortex flow generation is suppressed at an end part. Specifically, it is preferable that width L of liquid retainer section 22 corresponding to gap L [mm] between side plate members 24a and 24b, and width W [mm] measured just below narrowed section 23 of sheet-shaped reinforcing fiber bundle satisfies Formula (3).

$$L \leq W + 10 \quad (3)$$

As such, vortex flow generation at an edge, crack and bent edge of sheet-shaped reinforcing fiber bundle 1a are suppressed to provide thermoplastic resin-impregnated sheet-shaped reinforcing fiber bundle 1b having high quality and high stability in which reinforcing fibers 1 are disposed uniformly over full width W [mm] of thermoplastic resin-impregnated sheet-shaped reinforcing fiber bundle 1b. When the technique is applied to prepreg, prepregs can be improved in appearance quality while FRPs using the prepreg can be improved in mechanical characteristics and quality. It is preferable that L [mm] and W [mm] satisfy "L≤W+2 [mm]" so that cracks and bent edges of sheet-shaped reinforcing fiber bundle are suppressed.

From the viewpoint of improving dimension uniformity in the width direction of thermoplastic resin-impregnated sheet-shaped reinforcing fiber bundle b, it is preferable that L [mm] is W-5 [mm] or more.

From the viewpoint of suppressing vortex flow R generated by high hydraulic pressure at the bottom of liquid retainer section 22, it is preferable that the width restriction is performed at the bottom (at position G shown in FIG. 4a) of liquid retainer section 22. Further, it is more preferable that the width restriction is performed over a whole area of liquid retainer section 22 so that vortex flow R generation is almost completely suppressed to almost completely suppress crack and bent edge of sheet-shaped reinforcing fiber bundle.

Although the width restriction may be performed only at liquid retainer section 22 from a viewpoint of suppressing vortex flow at gap 26, it is preferable that the width restriction is also performed at narrowed section 23 from a viewpoint of suppressing excessive thermoplastic resin 2 attached to the side face of thermoplastic resin-impregnated sheet-shaped reinforcing fiber bundle 1b.

Width Restriction Mechanism

Other than the above-described width restriction performed by sidewall members 24a,24b, it is possible that width restriction mechanism 27a,27b provided between sidewall members 24a,24b perform width restriction as shown in FIG. 5. With such a width restriction mechanism capable of freely design the restricted width, thermoplastic resin-impregnated sheet-shaped reinforcing fiber bundles can be produced with various kinds of width by one application section. It is preferable to satisfy L2≤W+10 [mm], preferably L2≤W+2 [mm], where W indicates a width of sheet-shaped reinforcing fiber bundle just below the narrowed section and L2 indicates a width restricted by the width restriction mechanism at the lower edge. From a viewpoint of improved uniformity of size in the width direction of thermoplastic resin-impregnated sheet-shaped reinforcing fiber bundle 1b, it is preferable that L2 [mm] is W-5 [mm] or more. It is preferable that the width restriction mechanism is a plate-shaped bush from a viewpoint of simplicity although its shape and material are not limited in particular. From a viewpoint of maintaining horizontal flow of thermoplastic resin, it is preferable that the width, which is a vertical length of the width restriction mechanism in FIG. 5 (C) viewed along direction Z, is less than the gap between wall surface members 21a and 21b at the top close to the liquid level. On the other hand, from the viewpoints of suppressed thermoplastic resin deterioration and suppressed thermoplastic resin retention at the liquid retainer section, it is preferable that the width restriction mechanism has a middle and bottom shapes along the internal shape of application section. That is, the width restriction mechanism is preferably inserted to narrowed section 23.

FIG. 5 shows an example of plate-shape bush of width restriction mechanism in which the middle and bottom parts follow the tapered shape of liquid retainer section 22 and are inserted to narrowed section 23. FIG. 5 shows the example in which L2 [mm] is constant from the liquid level to the outlet, although the restricted width may not be constant as achieving the purpose of our width restriction mechanism. The width restriction mechanism can be fixed to application section 20 by any method. The plate-shaped bush can be fixed at some parts in the vertical direction to suppress the fluctuation of restricted width by deformation of plate-shaped bush under a high hydraulic pressure. It is preferable that the upper part is fixed with a stay while the bottom part is inserted to the application section so that width is easily restricted by the width restriction mechanism.

Shape of Liquid Retainer Section

As described above, it is important that the section area continuously decreases along the travelling direction of sheet-shaped reinforcing fiber bundle 1a in liquid retainer section 22 to increase the hydraulic pressure along the travelling direction of the sheet-shaped reinforcing fiber bundle. The phrase that "section area continuously decreases along the travelling direction of sheet-shaped reinforcing fiber bundle 1a" allows any shapes to the extent that the hydraulic pressure can be continuously increased along the travelling direction. In the cross section view of liquids retainer section 22, the shape may be tapered (straight lines) or curved like a trumpet shape. The section area-decreasing part may continue over a full length of liquid retainer section 22, or alternatively may have the part of which section area is constant or increasing. These examples will be explained in detail with reference to FIGS. 6 to 9.

FIG. 6 is a detailed cross section view showing application section 20b as another example of the one in FIG. 2. It is the same as application section 20, except for the different shapes of wall surface members 21c,21d constituting liquid retainer section 22. It is possible that liquid retainer section 22 is sectioned, like application section 20b shown in FIG. 6, into region 22a in which section area continuously decreases vertically downward (direction Z) and region 22b in which section area doesn't decrease. It is preferable that the part continuously decreasing the section area has vertical height H of 10 mm or more. It is more preferable that the part continuously decreasing the section area has vertical height H of 50 mm or more. As such, the hydraulic pressure generated at the bottom of liquid retainer section 22 can be sufficiently increased by securing the distance in which thermoplastic resin accompanied by sheet-shaped reinforcing fiber bundle 1a is compressed in region 22a continuously decreasing section area of liquid retainer section 22. As a result, fluff is prevented from clogging narrowed section 23 by hydraulic pressure while sheet-shaped reinforcing fiber bundle 1a is impregnated with thermoplastic resin 2 by hydraulic pressure.

When section region 22a continuously decreasing section area of liquid retainer section 22 has a tapered shape like application section 20 shown in FIG. 2 or application section 20b shown in FIG. 6, it is preferable that taper opening angle θ is an acute angle of 90 or less. As such, a high hydraulic pressure can be achieved by enhancing the compression effect of thermoplastic resin 2 in region 22a (tapered part) continuously decreasing section area in liquid retainer section 22.

FIG. 7 is a detailed cross section view showing application section 20c as another example of the one in FIG. 6. It is the same as application section 20b shown in FIG. 6, except for the 2-stage tapered shapes of wall surface members 21e,21f constituting liquid retainer section 22. As such, it is possible that region 22a continuously decreasing section area of liquid retainer section 22 is multi-stage tapered section beyond 2-stage. From a viewpoint of enhanced compression effect, it is preferable that opened angle θ of tapered section nearest narrowed section 23 is an acute angle. It is preferable that region 22a continuously decreasing the section area of liquid retainer section 22 has vertical height H of 10 mm or more. It is more preferable that the region continuously decreasing the section area has vertical height H of 50 mm or more. As shown in FIG. 7, region 22a continuously decreasing section area of liquid retainer section 22 has a multi-stage tapered section so that the volume of thermoplastic resin 2 to be retained in liquid retainer section 22 is maintained while angle θ of tapered section nearest narrowed section 23 is small. Thus, the hydraulic pressure generated at the bottom of liquid retainer section 22 is further increased to enhance the effects of excluding fluff and impregnating thermoplastic resin 2.

Figure 8:
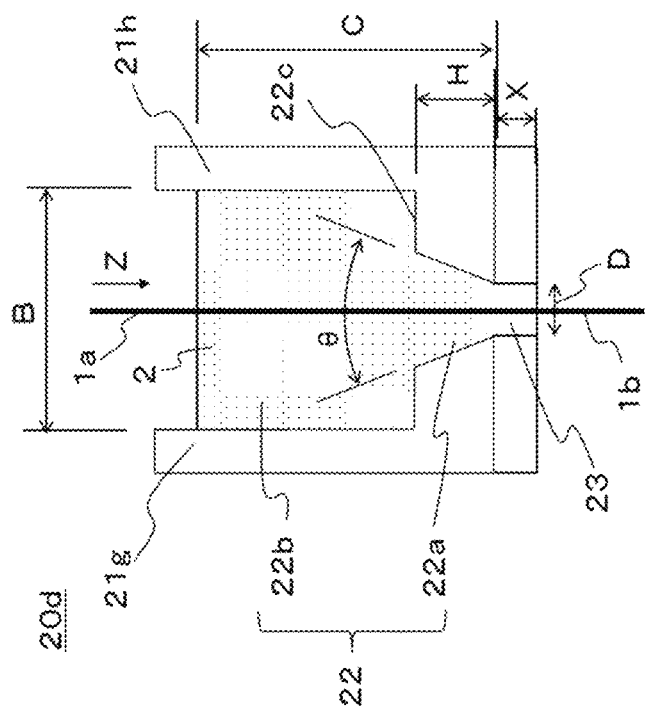
FIG. 8 is a detailed cross section view showing application section 20d as another example of the one in FIG. 6.

FIG. 8 is a detailed cross section view showing application section 20d as another example of the one in FIG. 6. It is the same as application section 20b shown in FIG. 6, except for the step shapes of wall surface members 21g,21h constituting liquid retainer section 22. As such, it is possible that region 22c continuously decreasing section area of liquid retainer section 22 is contained in another part of liquid retainer section 22 since our desire to increase hydraulic pressure can be achieved by region 22a continuously decreasing section area at the lowermost part of liquid retainer section 22. When liquid retainer section 22 has such a shape shown in FIG. 8, region 22a continuously decreasing section area can be maintained while volume capacity of thermoplastic resin 2 can be increased by increasing depth B of liquid retainer section 22. As a result, even when thermoplastic resin 2 cannot continuously be fed to application section 20d, thermoplastic resin 2 can be attached to sheet-shaped reinforcing fiber bundle 1a for a long time to improve productivity of thermoplastic resin-impregnated sheet-shaped reinforcing fiber bundle 1b.

Figure 9:
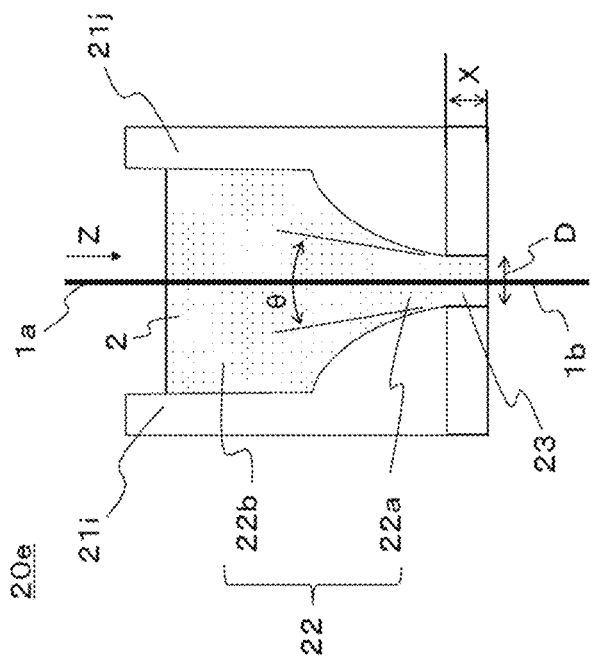
FIG. 9 is a detailed cross section view showing application section 20e as another example of the one in FIG. 6.

FIG. 9 is a detailed cross section view showing application section 20e as another example of the one in FIG. 6. It is the same as application section 20b shown in FIG. 6 except for the trumpet shape (curved shape) of wall surface members 21i,21j constituting liquid retainer section 22. Application section 22a shown in FIG. 6 has tapered (straight) region 22a continuously decreasing section area of liquid retainer section 22 although it may be a trumpet shape (curved shape) as shown in FIG. 8. It is preferable that the bottom part of liquid retainer section 22 smoothly connects the upper part of narrowed section 23. When the bottom part of liquid retainer section 22 and the upper part of narrowed section 23 are uneven, sheet-shaped reinforcing fiber bundle 1a might be caught on the step to generate fluff. When the region continuously decreasing section area of liquid retainer section 22 has a trumpet shape, it is preferable that opened angle θ of virtual tangent line at the lowermost part of region 22a continuously decreasing section area of liquid retainer section 22 is an acute angle.

It is possible that the section area of our liquid retainer section doesn't decrease smoothly to the extent that the desired effect is achieved although the section area decreases smoothly in the above-described example.

Figure 10:
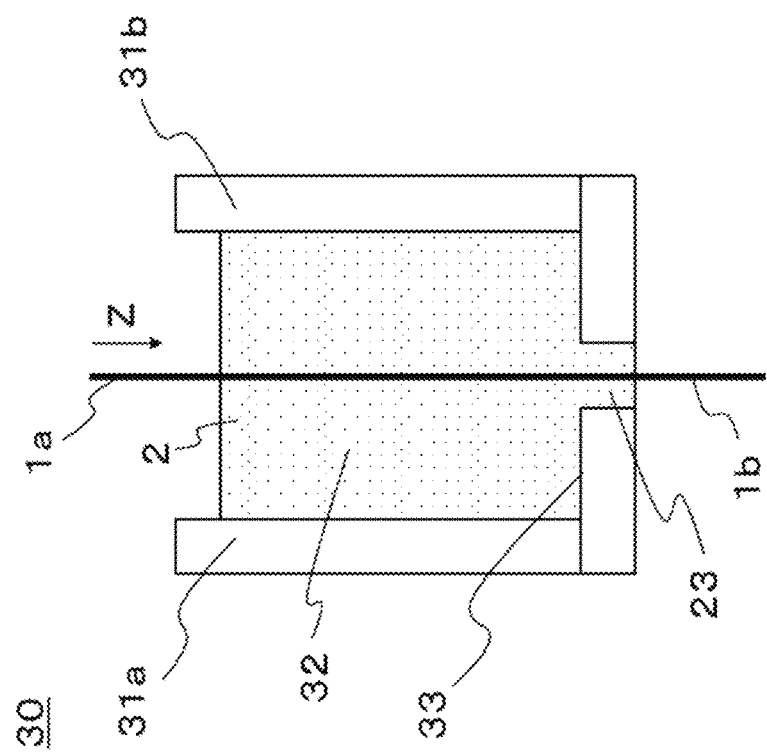
FIG. 10 is a detailed cross section view showing application section 30 different from our application section.

FIG. 10 is a detailed cross section view showing application section 30 different from our application section. Unlike our examples, liquid retainer section 32 shown in FIG. 10 is configured to have a section area suddenly discontinuously decreasing at the border to narrowed section 23, without including region 33 of which section area continuously decreasing vertically downward (direction Z). Therefore, sheet-shaped reinforcing fiber bundle 1a tends to clog.

Travelling Mechanism

A conventional roller or the like can be used suitably as a travelling mechanism to convey a sheet-shaped reinforcing fiber bundle or our thermoplastic resin-impregnated sheet-shaped reinforcing fiber bundle. It is preferable that rollers are provided along the vertical direction through the application section because our sheet-shaped reinforcing fiber bundle 1a is conveyed vertically downward.

It is preferable that a travelling path of sheet-shaped reinforcing fiber bundle is linearly provided to suppress the disturbed disposition and fluff of reinforcing fibers.

Thermoplastic Resin-Impregnated Sheet-Shaped Reinforcing Fiber Bundle

It is preferable that thermoplastic resin-impregnated sheet-shaped reinforcing fiber bundle 1b is impregnated with thermoplastic resin by 10% or more of impregnation degree in the application step. The impregnation degree of the thermoplastic resin-impregnated sheet-shaped reinforcing fiber bundle is measured by observing a section in the thickness direction of the thermoplastic resin-impregnated sheet-shaped reinforcing fiber bundle as follows. A sample of thermoplastic resin-impregnated sheet-shaped reinforcing fiber bundle embedded in epoxy resin is polished so that the section in the thickness direction of the thermoplastic resin-impregnated sheet-shaped reinforcing fiber bundle is well observed. The polished samples are photographed at magnification of 400 times with an ultra deep color 3D shape measurement microscope VHX-950F (controller part)/VH-Z100R (measurer part) (made by Keyence Corporation). The shooting range is 500 m width×thickness of thermoplastic resin-impregnated sheet-shaped reinforcing fiber bundle. The impregnation degree is calculated by Formula (4) from the areas of the thermoplastic resin-impregnated sheet-shaped reinforcing fiber bundle and the resin-impregnated part in the shot image.

$$\text{Impregnation degree [\%]} = (\text{total area occupied by impregnated part})/(\text{total area of thermoplastic resin-impregnated sheet-shaped reinforcing fiber bundle}) \times 100 \quad (4)$$

Further Impregnation

Our further impregnation step of thermoplastic resin will be explained. To adjust the impregnation degree to a desirable value, it is necessary to increase the impregnation degree by further impregnation device 40. In the specification, an impregnation further performed after the application step is called "further impregnation" as distinguished from an impregnation performed by application section 20. The further impregnation device is not limited in particular, and can be selected from conventional one according to the purpose.

Figure 11:
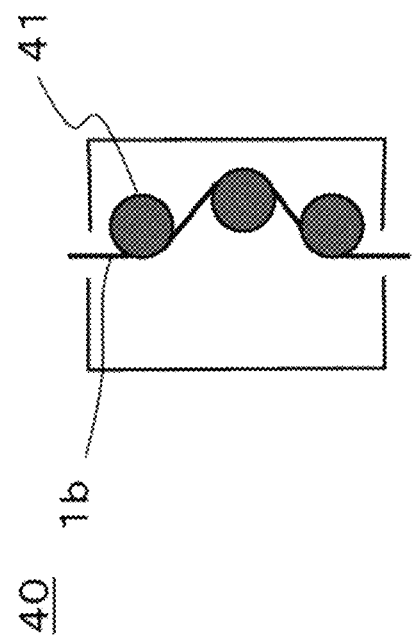
FIG. 11 is a detailed cross section view of further impregnation section 40 enlarged in FIG. 1.

With reference to FIGS. 11 to 14, the further impregnation step of thermoplastic resin 2 to sheet-shaped reinforcing fiber bundle 1a will be explained in detail. FIG. 11 is a detailed cross section view of further impregnation section 40 enlarged in FIG. 1. The further impregnation proceeds while thermoplastic resin-impregnated sheet-shaped reinforcing fiber bundle 1b passes through impregnation bar 41 along S-shape. It is possible that the number of impregnation bars 41, wrap angle and temperature are adjusted to achieve a desirable impregnation degree. It is possible that impregnation bar 41 is fixed or rotates dependently or independently with a motor or the like as accompanying the travel of thermoplastic resin-impregnated sheet-shaped reinforcing fiber bundle 1b. From a viewpoint of easy adjustment of impregnation degree, it is preferable that impregnation bar 41 rotates independently with a motor or the like. It is preferable that impregnation bar 41 is provided with an ultrasonic wave generator device to transmit ultrasonic vibration to thermoplastic resin-impregnated sheet-shaped reinforcing fiber bundle 1b while the further impregnation is performed. The further impregnation step progresses in shorter time by applying the ultrasonic vibration to improve productivity.

Figure 12:
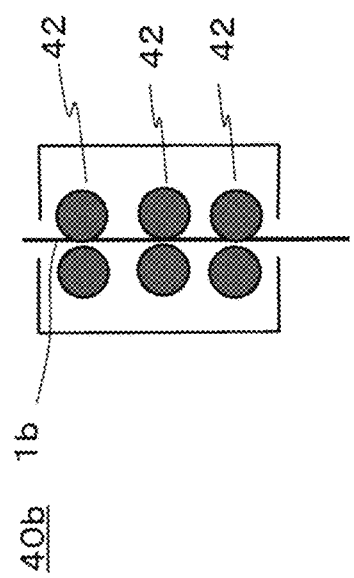
FIG. 12 is a detailed cross section view of further impregnation section 40b as another example of the one in FIG. 11.

FIG. 12 is a detailed cross section view of further impregnation section 40b as another example of the one in FIG. 11. Thermoplastic resin 2 is subject to the further impregnation step by heating/pressurizing thermoplastic resin-impregnated sheet-shaped reinforcing fiber bundle 1b between opposing impregnation rolls 42. It is possible that the number of impregnation rolls 42, roll temperature and pressure are adjusted to achieve a desirable impregnation degree. It is preferable that opposing impregnation rolls 42 are provided with concavo-convex parts capable of engaging with each other so that the further impregnation is performed without disturbing the alignment of reinforcing fibers constituting thermoplastic resin-impregnated sheet-shaped reinforcing fiber bundle 1b. It is possible that the clearance between opposing impregnation rolls 42 is simultaneously desirably adjusted to achieve the further impregnation step and the shaping step to be described later. It is possible that the roll temperature at the outlet of further impregnation section is set below the crystallization temperature or the glass transition temperature of thermoplastic resin 2 to simultaneously achieve the cooling.

Figure 13:
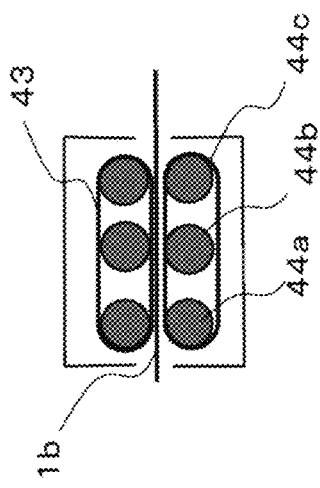
FIG. 13 is a detailed cross section view of further impregnation section 40c as another example of the one in FIG. 12.

FIG. 13 is a detailed cross section view of further impregnation section 40c as another example of the one in FIG. 12. The further impregnation step is performed by heating/pressurizing thermoplastic resin-impregnated sheet-shaped reinforcing fiber bundle 1b between opposing upper and lower belts 43. It is possible that the length of belts 43, pressurizing force, heating temperature and heating distance are adjusted to achieve a desirable impregnation degree. It is possible that the temperatures of belts 43 have thermal gradient to successively perform the shaping step and cooling step. Namely, thermoplastic resin-impregnated sheet-shaped reinforcing fiber bundle 1b can be shaped while a desirable impregnation degree is achieved by heating the rolls 44a,44b driving the belts above the melting point or the glass transition temperature of the thermoplastic resin and by keeping roll 44c below the crystallization temperature in FIG. 13.

Figure 14:
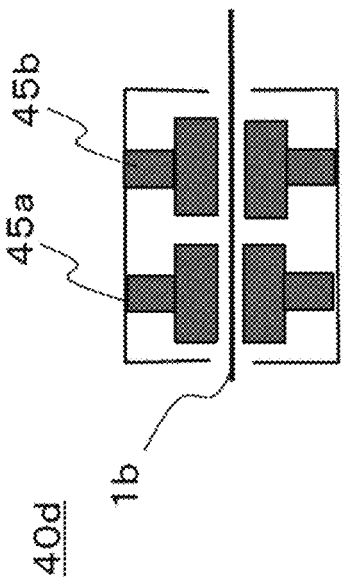
FIG. 14 is a detailed cross section view of further impregnation section 40d as another example of the one in FIG. 12.

FIG. 14 is a detailed cross section view of further impregnation section 40d as another example of the one in FIG. 12. Thermoplastic resin 2 is subject to the further impregnation step by successively heating and pressurizing thermoplastic resin-impregnated sheet-shaped reinforcing fiber bundle 1b between presses 45a and 45b. It is possible that the number of pressing machines, heating temperature and pressurizing force are adjusted to achieve a desirable impregnation degree. It is possible that the temperatures of successive pressing machines are changed to successively perform the shaping step and cooling step. Namely, thermoplastic resin-impregnated sheet-shaped reinforcing fiber bundle 1b can be shaped while a desirable impregnation degree is achieved by heating press 45a above the melting point or the glass transition temperature of the thermoplastic resin and by keeping press 45b below the crystallization temperature in FIG. 14.

In our further impregnation step, it is possible that further impregnation section 40 is charged with an inert gas. The charged inert gas can suppress deterioration and bridging of thermoplastic resin in the further impregnation step. From viewpoints of handling ability and productivity, it is preferable that the inert gas is nitrogen gas, although it is not limited in particular. From a viewpoint of less fluctuation of resin temperature, it is preferable that the inert gas is heated to a temperature of the same level as the thermoplastic resin temperature.

The further impregnation step may be performed just after the application step of thermoplastic resin, or alternatively the thermoplastic resin may be fed to the further impregnation step after cooling/solidifying it. From a viewpoint of productivity, it is preferable that the further impregnation step is successively performed just after the application step. The thermoplastic resin-impregnated sheet-shaped reinforcing fiber bundle may be fed directly to the further impregnation step just after the application step, or alternatively may be sandwiched by release sheets before being fed to the further impregnation step. From viewpoints of productivity and impregnation performance, it is preferable that the thermoplastic resin-impregnated sheet-shaped reinforcing fiber bundle is fed directly to the further impregnation step.

In our further impregnation step, sheet-shaped reinforcing fiber bundle 1a may travel in a condition that the direction of sheet-shaped reinforcing fiber bundle 1a that has travelled vertically downward in the application step is maintained, or alternatively may transfer a direction by using a roll and a bar. It is possible to simultaneously perform the further impregnation and the direction transfer of sheet-shaped reinforcing fiber bundle 1a.

Shaping Step

Our shaping step of resin to be cooled/solidified will be explained. To adjust to a desirable size and surface quality, it is necessary to adjust the dimension in our shaping step. The shaping/cooling device is not limited in particular, and can be selected from conventional devices according to the purpose.

The shaping step may be performed by a method such as roll method described above, double belt pressing method, intermittent pressing method and another method to pass through a nozzle having a desirable section shape.

The shaping and cooling may be simultaneously performed, or alternatively may be performed separately. The shaping step may be performed by a device different from the one performing the cooling step. It is possible that resin passes through a die nozzle having a desirable section shape and then passes between calendar rolls in which coolant flows.

The shaping step may be performed just after the further impregnation step of thermoplastic resin, or alternatively the thermoplastic resin may be reheated and fed to the further impregnation step after cooling/solidifying it. From a viewpoint of productivity, it is preferable that the shaping step and cooling/solidifying step are successively performed just after the further impregnation step.

The distance between the shaping device and the cooling device is not limited in particular, and can be adjusted properly such that desirable dimension and surface appearance are achieved. When the thermoplastic resin is a crystalline thermoplastic resin, it is preferable that the temperature of thermoplastic resin-impregnated sheet-shaped reinforcing fiber bundle to be fed to the cooling device is a crystallization temperature (Tc) or more. On the other hand, when the thermoplastic resin is an amorphous thermoplastic resin, it is preferable that the temperature of thermoplastic resin-impregnated sheet-shaped reinforcing fiber bundle to be fed to the cooling device is a glass transition temperature (Tg) or more.

It is preferable that a ratio of fiber volume content of thermoplastic resin-impregnated sheet-shaped reinforcing fiber bundle after passing through the application step relative to fiber volume content of thermoplastic resin-impregnated sheet-shaped reinforcing fiber bundle after passing through the shaping step is 0.9 to 1.0. The ratio of fiber volume contents within the range can suppress loss of thermoplastic resin to improve productivity.

Prepreg Width

Hereinafter, our thermoplastic resin-impregnated sheet-shaped reinforcing fiber bundle to be applied to FRP material will be called "prepreg" which is a kind of FRP precursor corresponding to an example of thermoplastic resin-impregnated sheet-shaped reinforcing fiber bundle 1b.

The shape of prepreg may have a wide width of several dozen cm to 2 m or may be a tape of which width is several mm to several dozen mm, as selected according to the use application. Recently, devices of so-called ATL (Automated Tape Laying) and AFP (Automated Fiber Placement) capable of automatically laminating narrow prepregs and prepreg tapes are used to improve the efficiency of prepreg lamination step. It is preferable that the prepreg has a width suitable for such devices. The ATL often uses a narrow prepreg having a width of approximately 7.5 cm, 15 cm, or 30 cm while the AFP often uses a prepreg tape having a width of approximately 3 mm to 25 mm.

Figure 19:
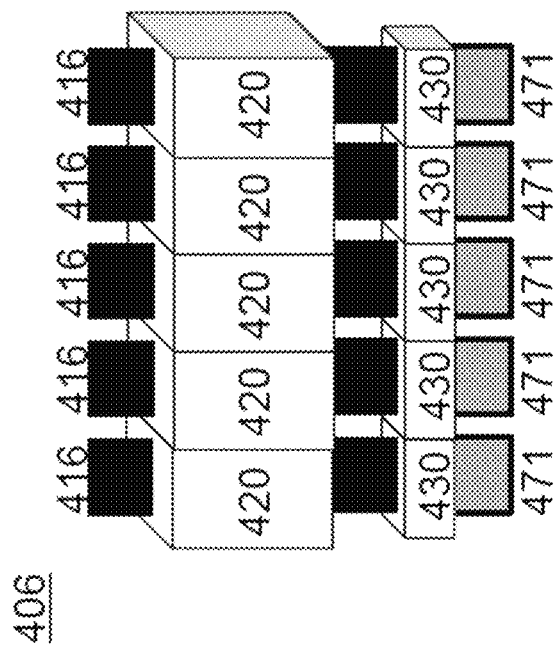
FIG. 19 is a schematic external view showing an example of our production method/apparatus of prepreg having a plurality of application sections.

The prepreg having a desirable width can be prepared by slitting wide prepregs having a width of 1 m to 2 m into thinner width although the method is not limited in particular. It is also possible that the slitting step is simplified or omitted by adjusting the width of our application section having a desirable width initially. For example, the width of application section outlet can be adjusted according to the thin prepreg having 30 cm width to be used for the ATL. To efficiently produce this prepreg, it is preferable that the product width is 30 cm. When a plurality of such production apparatuses are provided in parallel, prepregs can be produced by a plurality of production lines with the same travelling device, conveyance device, rolls and winder. FIG. 19 shows an example of production apparatus of prepreg provided with five application sections connected in parallel. Each of five pieces of sheet-shaped reinforcing fiber bundle 416 may go through each of independent reinforcing fiber preheating devices 420 and each of application sections 430 to produce five pieces of prepregs 471, although reinforcing fiber preheating devices 420 and application sections 430 may be integrated along the parallel direction. In such a configuration, it is possible that application section 430 includes five width restriction mechanisms and five application sections provided independently.

The prepreg tape can be produced by forming a sheet-shaped reinforcing fiber bundle made of 1 to 3 yarns of tape-shaped reinforcing fiber bundles to be passed through the application section of which width has been adjusted to make the tape width desirable. From a viewpoint of overlap control of tapes in lateral direction of prepreg tapes, the tape width is often required to be precise. Accordingly, it is preferable that the width of application section outlet is precisely controlled for L, L2 and W to satisfy $L \leq W+1$ mm and/or $L2 \leq W+1$ mm in this configuration.

Slit

The prepreg can be slit by a conventional slitting device without particular limitation. It is possible that the prepreg is once rolled up and set to a slitting device to perform a slitting. It is also possible that the prepreg is subject to a slitting step successively from the prepreg production process without rolling the prepreg up for efficiency. The wide prepreg having a width of 1 m or more may slit directly into a desirable width in the slitting step, or alternatively it may be cut into thin prepregs having a width of about 30 cm and then slit into a desirable width.

When the thin prepreg or the tape prepreg is fed to plurality of application sections provided in parallel, it is possible that each release sheet is fed independently or that one wide release sheet is fed to be laminated with a plurality of prepregs. The obtained prepreg of which edges in the width direction are cut off can be fed to the ATL or AFP device. In this instance, because most of the edges cut off are to be release sheets so that the amount of thermoplastic resin attached to the slitting cutter is reduced, the cleaning period of slitting cutter blade can be extended.

Modification (Variation) and Application of Our Invention

A plurality of application sections can enhance the efficiency and function of production process.

Figure 15:
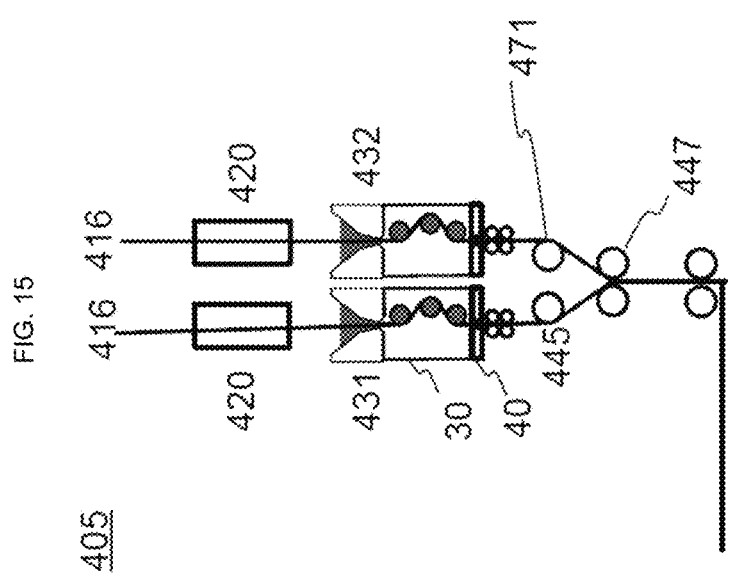
FIG. 15 is a schematic section view showing an example of our laminating step of thermoplastic resin-impregnated sheet-shaped reinforcing fiber bundles.

It is possible that a plurality of application sections are provided to laminate a plurality of thermoplastic resin-impregnated sheet-shaped reinforcing fiber bundles. FIG. 15 shows an example of two application sections to perform our laminating step of thermoplastic resin-impregnated sheet-shaped reinforcing fiber bundles. Two pieces of thermoplastic resin-impregnated sheet-shaped reinforcing fiber bundle 471 drawn from first application section 431 and second application section 432 pass through first further impregnation section 433 and second further impregnation section 434, through first shaping section 435 and second shaping section 436, through first cooling/solidification section 437 and second cooling/solidification section 438 and through turning roll 445, and are laminated by laminating roll 447 provided below. The turning roll may be substituted by a turning guide subjected to release treatment or the like. It is possible that the thermoplastic resin-impregnated sheet-shaped reinforcing fiber bundle is laminated before or after the further impregnation step although it is laminated after passing through the cooling step in FIG. 15. Because such a lamination type thermoplastic resin-impregnated sheet-shaped reinforcing fiber bundle can improve efficiency in prepreg lamination, it is suitable for producing thick FRPs. Also, because such a multi-layered thin prepreg can improve toughness and impact resistance of FRP, it is suitable for producing thin multi-layered prepreg efficiently. Further, a hetero-coupled prepreg given functionality can easily be produced by laminating different kinds of prepregs. In this instance, it is possible to change reinforcing fiber kind, reinforcing fiber fineness, filament number, mechanical characteristics, fiber surface characteristics or the like. Different kinds of thermoplastic resin may be used. For example, it is possible to produce the hetero-coupled prepreg made by laminating prepregs having different thicknesses and different mechanical characteristics. Furthermore, it is possible that a prepreg excellent in mechanical characteristics and toughness is easily produced by laminating two kinds of prepregs, wherein thermoplastic resin excellent in impregnation has been applied to the one prepreg by the first application section and another resin excellent in toughness has been applied to the other prepreg by the second application section.

For another example in FIG. 19, it is possible that a plurality of application sections are provided in parallel along the travelling direction of sheet-shaped reinforcing fiber bundle, or that a plurality of application sections are provided in parallel along the width direction of sheet-shaped reinforcing fiber bundle. With this configuration, a narrow or tape-shaped thermoplastic resin-impregnated sheet-shaped reinforcing fiber bundle can be produced efficiently. Further, a thermoplastic resin-impregnated sheet-shaped reinforcing fiber bundle having characteristics changed along the width direction can be produced by providing different reinforcing fibers or thermoplastic resins by each application section.

For another example, it is possible that a plurality of application sections are provided in series along the travelling direction of sheet-shaped reinforcing fiber bundle. FIG. 20 shows an example of two application sections provided in series.

With this serial disposition, kinds of thermoplastic resins can be changed along the thickness direction of thermoplastic resin-impregnated sheet-shaped reinforcing fiber bundle. Further, travelling stability or high-speed travelling performance can be improved even by the same kind of thermoplastic resin to be applied under different application conditions at each application section. For example, it is possible that a prepreg excellent in mechanical characteristics and impregnation is easily produced by laminating two kinds of prepregs, wherein thermoplastic resin having a low viscosity has been applied to the one prepreg by the first application section and another resin excellent in toughness has been applied to the other prepreg by the second application section. Furthermore, a prepreg provided with an adhesive layer to be adhered to another material on the surface can be produced easily by applying a first thermoplastic resin having a thermally resistant resin at the first application section and applying a second thermoplastic resin having a melting point lower than that of the first thermoplastic resin at the second application section.

Hereinbefore, several examples have been shown to provide a plurality of application sections. The number of application sections are not limited in particular and may be changed according to the purpose. These configurations may be combined. Further, the size, shape and application condition such as temperature of application section may be mixed.

As described above, our production method is excellent in extensibility capable of making the product excellent in performance and function as well as making the production efficient and stable.

Thermoplastic Resin Feeding Mechanism

Thermoplastic resin can be fed to the application section to retain thermoplastic resin by a conventional apparatus although thermoplastic resin feeding mechanism is not limited in particular. It is preferable that the thermoplastic resin is continuously fed to application section 20 so that sheet-shaped reinforcing fiber bundle 1a stably travels without disturbing upper liquid surface of application section 20. For example, it is possible that the thermoplastic resin is fed from a retainer tank by a driving force of self weight or that it is continuously fed by a pump or the like. A gear pump, tube pump, pressure pump or the like may be selected according to thermoplastic resin characteristics. It is possible to use a continuous extruder. It is preferable to employ the thermoplastic resin feeding mechanism capable of performing a continuous feed according to the applied amount so that the liquid level is constant at the top of application section of thermoplastic resin. To achieve that, it is possible to employ a mechanism to monitor the liquid level or the weight at the application section to be fed back to a feeding device.

Online Monitoring

Figure 16:
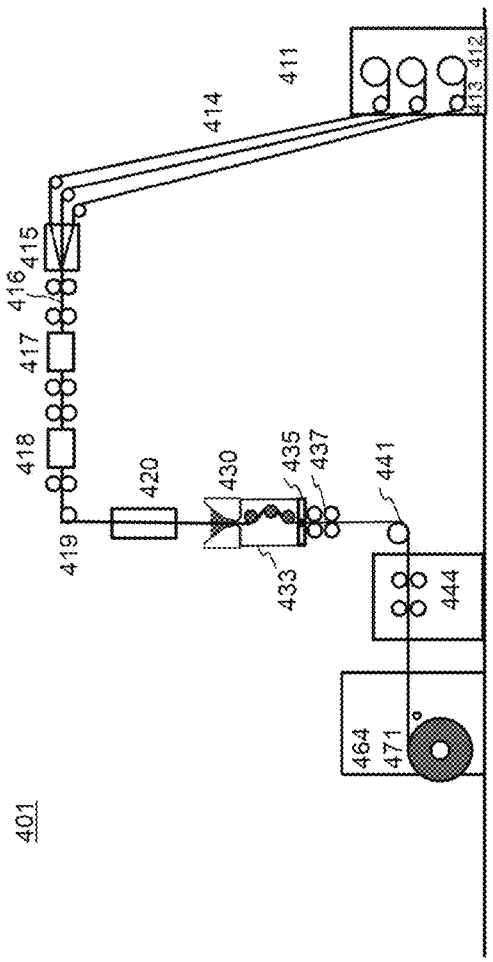
FIG. 16 is a schematic section view showing an example of our production method/apparatus of prepreg.

It is preferable to employ a mechanism to perform online monitoring of applied amount. The online monitoring can be performed by a conventional device without particular limitation. For example, it is possible to employ a thickness measurement device such as beta ray meter. In this example, difference between sheet-shaped reinforcing fiber bundle thickness and thermoplastic resin-impregnated sheet-shaped reinforcing fiber bundle thickness measured is analyzed to estimate the applied amount. The temperature of application section and gap D (see FIG. 2) of narrowed section 23 can be adjusted by using the online monitored applied amount immediately fed back to the application section. The applied amount monitoring may be used as defect monitoring. In FIG. 16, the thickness of sheet-shaped reinforcing fiber bundle 416 can be measured near turning roll 419 while the thickness of thermoplastic resin-impregnated sheet-shaped reinforcing fiber bundle can be measured between application section 430 and turning roll 441. It is preferable that the online defect monitoring is performed by using infrared ray, near-infrared ray, camera (image analysis) or the like.

Our coating machine comprises: a travelling mechanism of a sheet-shaped reinforcing fiber bundle in which reinforcing fibers are unidirectionally oriented to be run substantively vertically downward and; an application mechanism, wherein the application mechanism retaining thermoplastic resin inside comprises a liquid retainer section and a narrowed section which are communicated with each other, the liquid retainer section has a part of which section area continuously decreases along the travelling direction of the sheet-shaped reinforcing fiber bundle, and the narrowed section having a slit-shaped cross section has an area smaller than that of the top face of the liquid retainer section.

A prepreg according to an example of thermoplastic resin-impregnated sheet-shaped reinforcing fiber bundle specifically produced by the coating machine will be explained in detail. Nonetheless, this disclosure should not be interpreted as being limited to the following examples described below.

FIG. 16 is a schematic section view showing an example of our production method/apparatus of prepreg. A plurality of reinforcing fiber bobbins 412 are set to creel 411 through turning guide 413 and are drawn out upward. Reinforcing fiber bundles 414 can be drawn out by a constant tension with a brake mechanism attached to the creel. Reinforcing fiber bundles 414 drawn out are disposed orderly with reinforcing fiber disposition device 415 to shape sheet-shaped reinforcing fiber bundle 416. The reinforcing fiber bundle may contain 2 to a few hundreds of yarns adjustably according to a desirable prepreg width and fiber basis weight, although the reinforcing fiber containing only 3 yarns is illustrated in FIG. 16. Sheet-shaped reinforcing fiber bundle 416 is conveyed vertically downward through widening device 417, smoothing device 418 and turning roll 419. In FIG. 16, sheet-shaped reinforcing fiber bundle 416 is conveyed linearly through devices provided from reinforcing fiber sequence device 415 to turning roll 419. It is possible to skip or omit widening device 417 and smoothing device 418 according to the purpose. It is possible to change the order of providing reinforcing fiber disposition device 415, widening device 417 and smoothing device 418 depending on purposes. Sheet-shaped reinforcing fiber bundle 416 travels vertically downward from turning roll 419 to reach turning roll 441 through reinforcing fiber preheating device 420, application section 430, further impregnation section 433, shaping section 435 and cooling section 437. Application section 430 can have any shape of application section shape to the extent that the desired effect is achieved. Examples of the shape are shown in FIGS. 2 and 6 to 9. It is possible to be provided with a bush as shown in FIG. 5. It is taken out with takeout device 444 and is wound with winding device 464 to prepare thermoplastic resin-impregnated sheet-shaped reinforcing fiber bundle. In FIG. 12, illustration of a thermoplastic resin feeding device and an online monitoring device is omitted.

FIG. 17 is a schematic section view showing another example of our production method/apparatus of prepreg. FIG. 17 differs from FIG. 16 in that reinforcing fiber bundle 414 is drawn out from creel 411 to directly shape sheet-shaped reinforcing fiber bundle 416 with reinforcing fiber disposition device 415 and then is conveyed linearly through widening device 417 to smoothing device 418 to lead sheet-shaped reinforcing fiber bundle 416 upward. With this configuration, providing devices at upper levels becomes not necessary so that installation work of providing stages can be greatly simplified.

FIG. 18 is a schematic section view showing yet another example of our production method/apparatus of prepreg. In FIG. 18, creel 411 is installed upstairs to make the travelling path of sheet-shaped reinforcing fiber bundle 416 straight.

INDUSTRIAL APPLICATIONS

Thermoplastic resin-impregnated sheet-shaped reinforcing fiber bundles produced by our production method can widely be applied to FRP typified by CFRP used for structural material, interior material, pressure vessel and industrial material in the fields of aerospace, automobile, train, ship, sport material, medical equipment, housing, civil engineering/construction or the like.

The invention claimed is:

1. A method of producing a thermoplastic resin-impregnated sheet-shaped reinforcing fiber bundle, wherein reinforcing fibers made of a continuous fiber are impregnated with a thermoplastic resin, comprising:
    an application step of applying the thermoplastic resin to a sheet-shaped reinforcing fiber bundle consisting of unidirectionally disposed reinforcing fibers made of the continuous fiber and passing through an application section retaining the thermoplastic resin to make a fiber-reinforced thermoplastic resin;
    a further impregnating step of further impregnating, in a further impregnation device, the applied thermoplastic resin into the fiber-reinforced thermoplastic resin, wherein the further impregnation device is distinct from the application section and comprises at least one impregnation bar; and
    a shaping step of shaping the fiber-reinforced thermoplastic resin to be solidified by cooling, wherein
    the thermoplastic resin is applied to the fiber-reinforced thermoplastic resin passing vertically downward through the application section in the application step, and
    the thermoplastic resin is heated to a temperature of a melting point+30° C. or more to have a viscosity of 5 to 200 Pa·s in the application step and the further impregnation step,
    wherein the application section comprises a liquid retainer section and a narrowed section that communicate with each other, the liquid retainer section comprising opposing wall surfaces defining a section area that continuously decreases along a travelling direction of the sheet-shaped reinforcing fiber bundle, the narrowed section has a slit-shaped cross section of which area is smaller than that of a top face of the liquid retainer section,
    wherein width L [mm] of liquid retainer section at a bottom in a reinforcing fiber disposition direction and width W [mm] of the sheet-shaped reinforcing fiber bundle below the narrowed section satisfy L≤W+10 [mm].

2. The method according to claim 1, wherein the thermoplastic resin is retained for 1 to 60 min in the liquid retainer section.

3. The method according to claim 2, wherein shear force F of 1 to 1,500 N.

4. The method according to claim 2, wherein a width restriction mechanism to restrict a width of the sheet-shaped reinforcing fiber bundle is provided in the liquid retainer section, and width W [mm] of the sheet-shaped reinforcing fiber bundle below the narrowed section and width L2 [mm] restricted by the width restriction mechanism at a bottom end of the width restriction mechanism satisfy L2≤W+10 [mm].

5. The method according to claim 4, wherein the width restriction mechanism is provided over a whole length of the liquid retainer section and the narrowed section.

6. The method according to claim 2, wherein the liquid retainer section has a part of which vertical height is 10 mm or more and of which section area continuously decreases.

7. The method according to claim 1, wherein the application step, the further impregnation step and the shaping step are performed successively.

8. The method according to claim 1, wherein the thermoplastic resin is applied in an inert gas atmosphere in the application step.

9. The method according to claim 1, wherein the applied thermoplastic resin is further impregnated in an inert gas atmosphere in the further impregnation step.

10. The method according to claim 1, wherein a ratio of fiber volume content of the fiber-reinforced thermoplastic resin after the application step relative to a fiber volume content of the thermoplastic resin-impregnated sheet-shaped reinforcing fiber bundle after the shaping step is 0.9 or more.

11. The method according to claim 1, wherein the sheet-shaped reinforcing fiber bundle is heated before passing through the application section in the application step.

12. The method according to claim 1, wherein the sheet-shaped reinforcing fiber bundle is smoothed before passing through the application section in the application step.

13. The method according to claim 1, wherein the sheet-shaped reinforcing fiber bundle is widened before passing through the application section in the application step.

14. The method according to claim 1, wherein an ultrasonic vibration is transmitted to the fiber-reinforced thermoplastic resin in the further impregnation step.

15. The method according to claim 1, wherein an ultrasonic vibration is transmitted to the thermoplastic resin retained in the application section in the application step.

* * * * *